United States Patent
Suzuki et al.

[19]

[11] Patent Number: 5,956,655
[45] Date of Patent: *Sep. 21, 1999

[54] PORTABLE COMMUNICATION DEVICE FOR RADIO COMMUNICATION SYSTEM

[75] Inventors: Yasuo Suzuki; Takashi Amano, both of Kanagawa-ken; Yukio Mori, Saitama-ken; Shinji Watanabe, Kanagawa-ken; Tomiaki Ishihara, Kanagawa-ken; Hiroshi Horiguchi, Kanagawa-ken, all of Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/616,744

[22] Filed: Mar. 15, 1996

[30] Foreign Application Priority Data

Mar. 15, 1995 [JP] Japan .................................. 7-054872

[51] Int. Cl.$^6$ .............................. H04B 1/38; H04M 1/00
[52] U.S. Cl. ......................... 455/566; 455/575; 455/90; 455/564; 345/169
[58] Field of Search ..................................... 455/425, 550, 455/564, 566, 575, 90; 379/428, 433, 434, 396; 345/168–169

[56] References Cited

U.S. PATENT DOCUMENTS

| 4,385,366 | 5/1983 | Housey, Jr. ............................... 364/900 |
| 5,371,788 | 12/1994 | Baals et al. .............................. 379/396 |
| 5,422,656 | 6/1995 | Allard et al. ............................ 455/566 |
| 5,515,420 | 5/1996 | Urasaka et al. ......................... 455/566 |
| 5,579,535 | 11/1996 | Orlen et al. ............................. 455/421 |
| 5,633,912 | 5/1997 | Tsoi ......................................... 455/566 |

FOREIGN PATENT DOCUMENTS

| 000101211 | 2/1984 | European Pat. Off. ............... 345/168 |
| 57-75365 | 11/1982 | Japan . |
| 359188724 | 10/1984 | Japan ..................................... 345/168 |

*Primary Examiner*—Nguyen Vo
*Attorney, Agent, or Firm*—Foley & Lardner

[57] ABSTRACT

A portable communication device capable of realizing an improved portability and an improved maneuverability at the same time. A portable communication device, includes an input unit having a plurality of input keys; a display unit having a plurality of display regions in correspondence to the input keys, for displaying names of functions assigned to the input keys in an arrangement corresponding to a spatial arrangement of the input keys; and a communication unit for making a communication by transmitting and receiving communication data according to a user's input entered by operating the input keys.

22 Claims, 28 Drawing Sheets

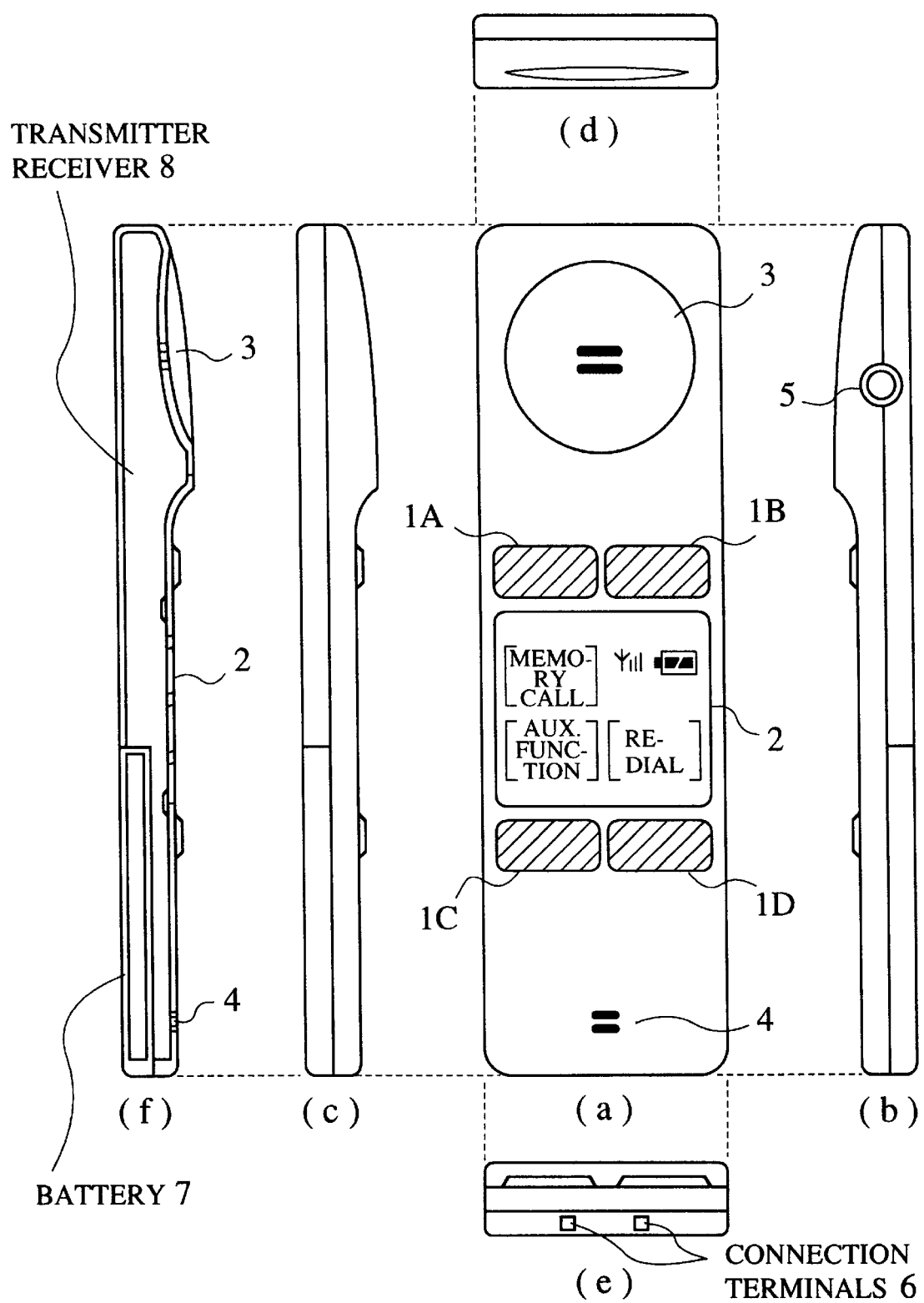

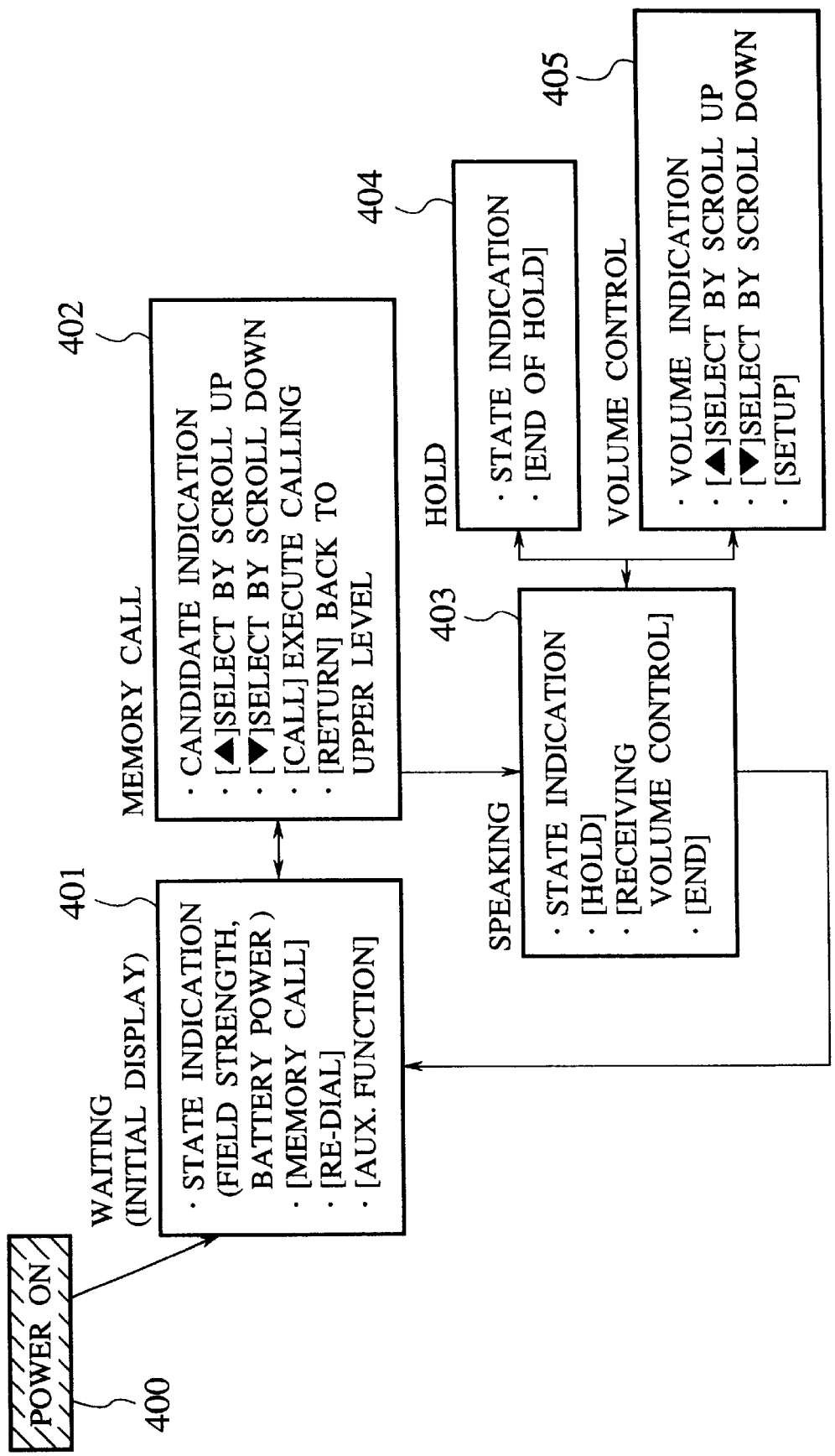

(a) (b)

5,956,655

PORTABLE COMMUNICATION DEVICE FOR RADIO COMMUNICATION SYSTEM

BACKGROUND OF THE INVENTION

1. Field of the Invention

The present invention relates to a portable communication device suitable for use in a mobile communication system such as a portable telephone service system.

2. Description of the Background Art

In a mobile communication system such as a portable telephone service system, a portable terminal device as shown in FIG. 1 has been used conventionally. This portable terminal device of FIG. 1 has an input unit 1 formed by a number of input keys, a display unit 2 formed by a display screen, a speech output unit 3 formed by a loudspeaker, and a speech input unit 4 formed by a microphone.

In this conventional portable terminal device, at a time of calling, a dial call is made by carrying out a dial calling operation in which numerical keys for numbers 0 to 9 constituting the input unit 1 are manipulated in order to enter a telephone number of a desired receiver side while watching entered numbers displayed on the display unit 2, and a call key is manipulated after a telephone number is entered correctly.

Moreover, it is also possible to make a memory call by carrying out a memory calling operation in which a name and a telephone number of a receiver side are registered in advance in a memory provided inside a portable terminal device, and then a telephone number of a desired receiver side is specified by selecting an appropriate registered information from a display of the registered information on the display unit 2, and a call key is manipulated after the telephone number of the desired receiver side is specified correctly.

Now, in such a portable terminal device, there is a need to arrange about 20 different input keys such as numerical keys for numbers 0 to 9, a "power" key, a "mute" key, a "memory" key, a "clear" key, a "call" key, etc., on the portable terminal device, and in order to realize an arrangement of these input keys with a reasonable level of maneuverability for not causing too much inconvenience in manipulating these keys, it is necessary to secure a fair amount of arrangement space on a surface of the terminal device body. Moreover, when it is required to secure an arrangement space necessary for a display unit capable of displaying characters and numbers in a reasonable size for not causing too much inconvenience in reading the display, it is necessary for the portable terminal device body to have a frontal area of approximately 110 mm×40 mm at least, and this required size of the terminal device body can potentially damage the portability of the portable terminal device.

In addition, the input keys are assigned with distinct functions such as "mute (holding function)", "memory (registration function)", "clear (cancellation function)", "call (calling function)", etc., and it takes a considerable amount of time until a user memorizes positions of many input keys and their assigned functions in correspondence in order to master all these many functions, so that it has been particularly difficult for a beginner to handle such a portable terminal device with ease. Furthermore, characters indicating a name of a function assigned to each input key are to be provided on a surface of each input key, but characters are so small and/or a name is so contracted due to a limited available space that a user may have difficulties in reading and/or understanding this indication on each input key.

On the other hand, in order to improve the portability of the portable terminal device, it is necessary to reduce a size of the device body as much as possible, but a reduction of a size of the device body also requires a reduction of a size of each input key constituting the input unit in proportion, and the input keys in reduced size could lead to an inconvenience in the manipulation of the input keys that can potentially damage the maneuverability of the portable terminal device.

Thus, in the conventional portable terminal device, there has been a conflict between a requirement from the maneuverability and a requirement from the portability, that cannot be resolved without making some compromise on either requirement.

SUMMARY OF THE INVENTION

It is therefore an object of the present invention to provide a portable communication device capable of realizing an improved portability and an improved maneuverability at the same time.

It is another object of the present invention to provide a radio communication system capable of utilizing the above portable communication device of the present invention advantageously.

According to one aspect of the present invention there is provided a portable communication device, comprising: an input unit having a plurality of input keys; a display unit having a plurality of display regions in correspondence to the input keys, for displaying names of functions assigned to the input keys in an arrangement corresponding to a spatial arrangement of the input keys; and a communication unit for making a communication by transmitting and receiving communication data according to a user's input entered by operating the input keys.

According to another aspect of the present invention there is provided a radio communication system, comprising: a portable communication device including: an input unit having a plurality of input keys; a display unit having a plurality of display regions in correspondence to the input keys, for displaying names of functions assigned to the input keys in an arrangement corresponding to a spatial arrangement of the input keys; a memory unit for storing information on communication receiving sides to be communicated with; and a communication unit for making a communication by transmitting and receiving communication data according to a user's input entered by operating the input keys; and an information transfer device including: a storage unit for temporarily storing externally entered information on communication receiving sides; and a transfer unit for transferring the information on communication receiving sides from the storage unit to the memory unit of the portable communication device.

Other features and advantages of the present invention will become apparent from the following description taken in conjunction with the accompanying drawings.

BRIEF DESCRIPTION OF THE DRAWINGS

FIG. 3 is a front view, a right side view, a left side view, a top view, a bottom view, and a vertical sectional view of the portable communication device of FIG. 2.

FIG. 5 is an operation state transition diagram for a case of a "memory call" operation in the portable communication device of FIG. 2.

DETAILED DESCRIPTION OF THE PREFERRED EMBODIMENTS

Referring now to FIG. 2 to FIG. 9, the first embodiment of the portable communication device according to the present invention will be described in detail.

Figure 1:
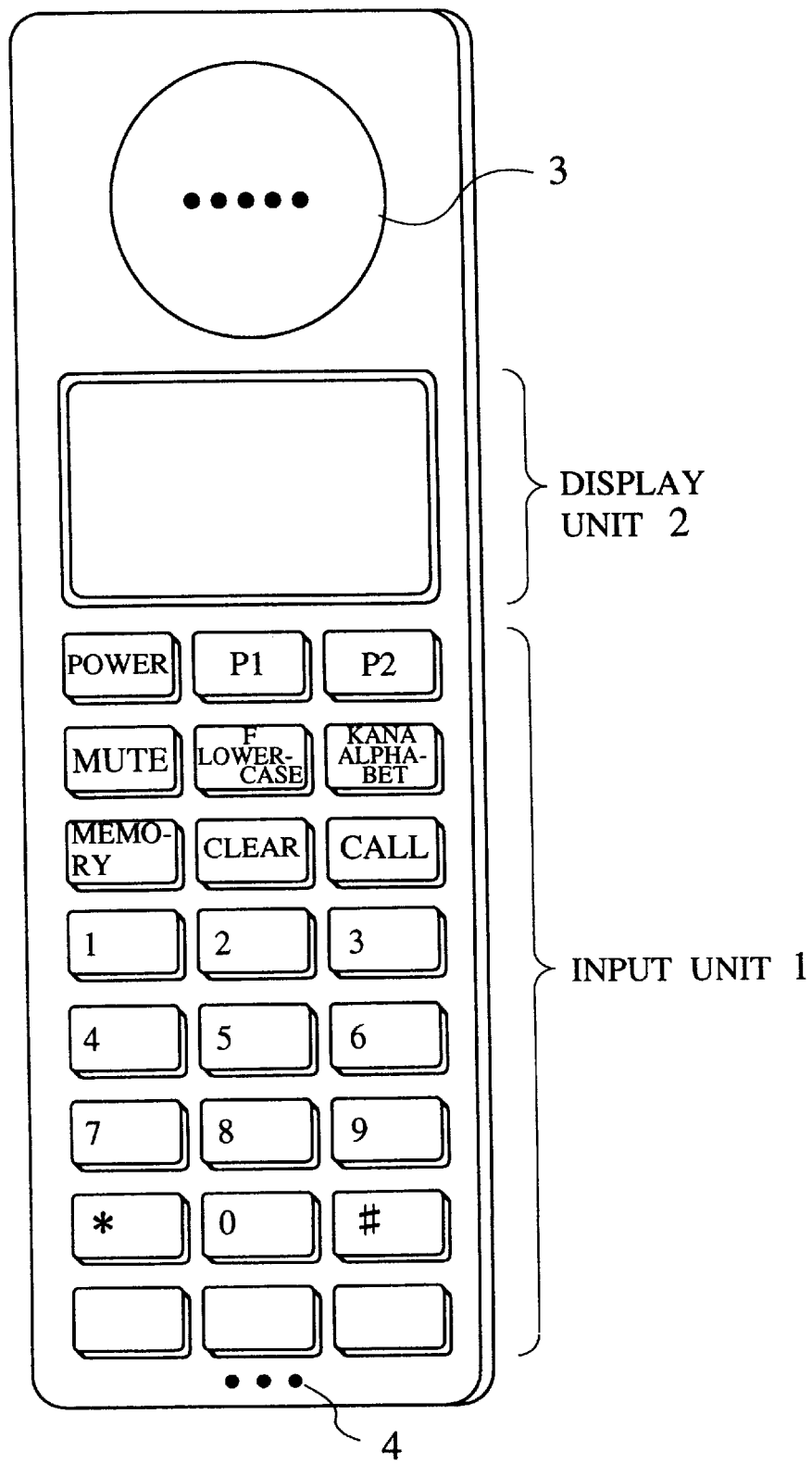
FIG. 1 is a front view of a conventional portable communication device.
Figure 2:
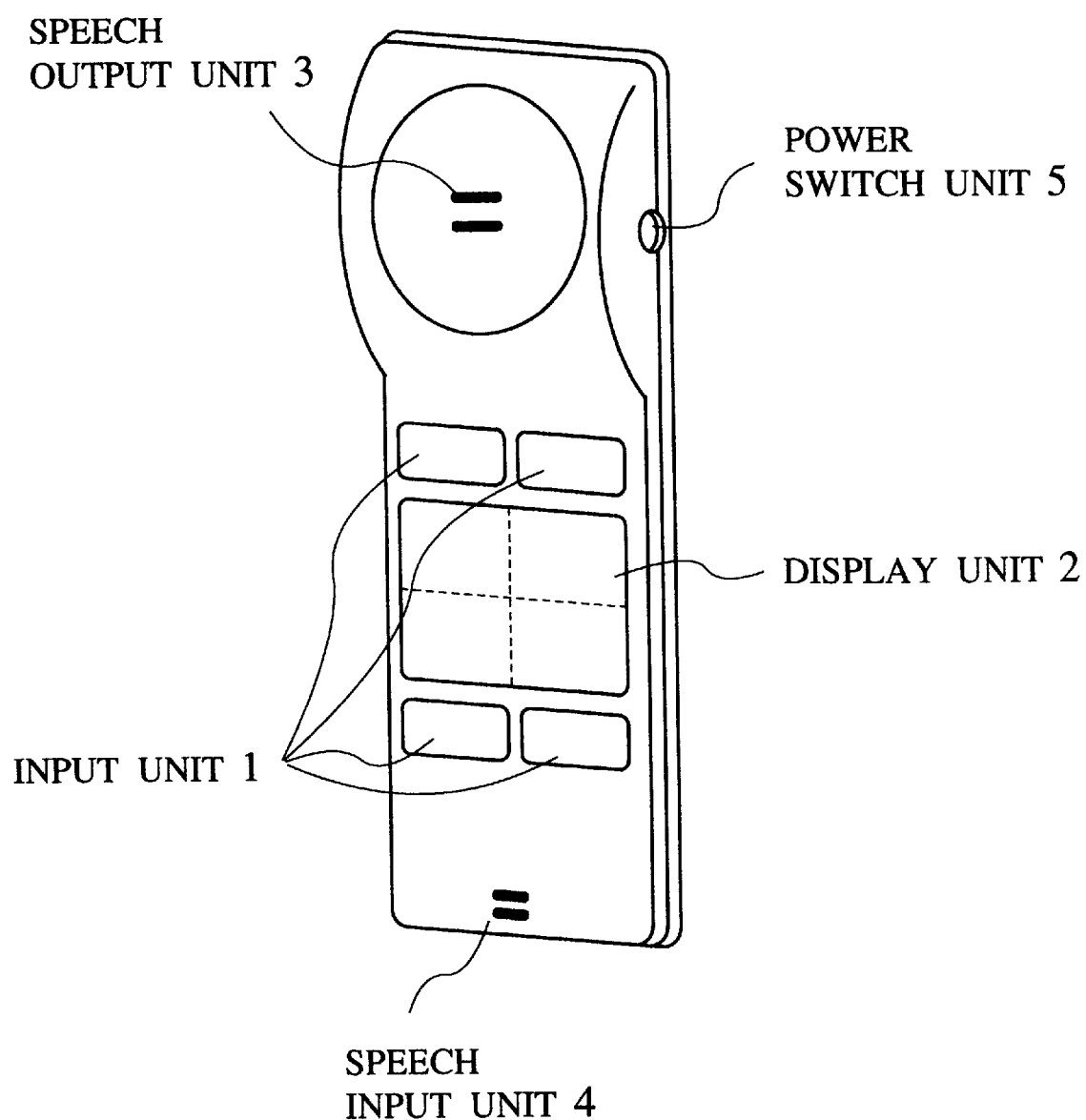
FIG. 2 is a perspective view of the first embodiment of a portable communication device according to the present invention.

FIG. 2 shows a basic configuration of the portable communication device in the first embodiment, which comprises: an input unit 1 including four input keys, provided at a middle section of a device body; a display unit 2 provided at a middle section of a device body and surrounded by the input keys of the input unit 1, including four display regions for displaying functions of the input keys that are provided at spatially corresponding positions, according to an operation state of the portable communication device; a speech output unit 3 provided near an upper end of a device body; a speech input unit 4 provided near a lower end of a device body; and a power switch unit 5 provided on a side of a device body. More specifically, the input unit 1 can formed by push keys or push buttons, the display unit 2 can be formed by a liquid crystal, ferroelectric, or plasma display panel, the speech output unit 3 can be formed by a loudspeaker, the speech input unit 4 can be formed by an electrostatic microphone, and the power switch unit 5 can be formed by a push key, a push button or a slide key, for example.

FIG. 3 shows an external shape of the portable communication device of FIG. 2 along with an exemplary function displays on the display unit 2, where a part (a) shows a front view, a part (b) shows a right side view, a part (c) shows a left side view, a part (d) shows a top view, a part (e) shows a bottom view, and a part (f) shows a vertical sectional view. In FIG. 3, the portable communication device also includes connection terminals 6 provided on a bottom side for connection with an external battery charger, a chargeable battery 7 provided on a back side, and a transmitter-receiver 8 provided inside a device body for transmitting radio signals by converting digital speech/image transmission signals and receiving digital speech/image reception signals by converting received radio signals.

In this portable communication device of the first embodiment, four input keys 1A to 1D of the input unit 1 are arranged around the display unit 2, the input keys 1A and 1B above the display unit 2 and the input keys 1C and 1D below the display unit 2 as shown in FIG. 3. The display unit 2 is divided into four display regions in an arrangement corresponding to the spatial arrangement of the input keys, where each display region displays a name of a function assigned to the corresponding input key. In an exemplary display shown in FIG. 3, the input key 1A is designated as an input key for a function called "memory call", the input key 1C is designated as an input key for a function called "auxiliary function", and the input key 1D is designated as an input key for a function called "re-dial".

By arranging the input unit 1 and the display unit 2 separately in this manner, and controlling the display unit 2 to display a name of function assigned to each input key at a display region in spatial correspondence to each input key, it becomes possible for a user to manipulate each input key while visually confirming a function assigned to it. In particular, unlike a case of using a touch panel which functions as an input key incorporating a display for that input key, it is possible to prevent the smearing of the display unit 2 by sebaceous matters in this portable communication device.

Moreover, it is possible for the display unit 2 to occupy a larger area than the input unit 1, so that it becomes possible to display a name of a function assigned to each input key more clearly, in larger size, and therefore it becomes possible for a user to comprehend the displayed function more easily.

Furthermore, unlike a conventional portable telephone device having input keys for numbers 0 to 9 and input keys assigned with functions such as a call key, the portable communication device of the first embodiment includes a lesser number of keys to be manipulated, so that it becomes possible for a user to manipulate the input keys more easily.

Next, with references to FIGS. 4A to 4D, a manner of assigning a plurality of functions hierarchically to each input key and a manner of commanding each function in a case of using the portable communication device of this first embodiment as a communication terminal will be described in detail.

Figure 4A:
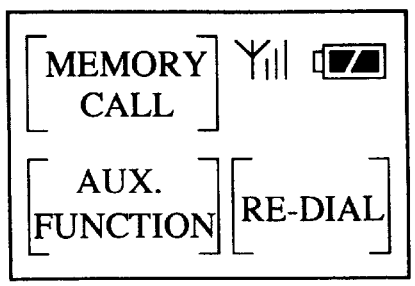
FIGS. 4A to 4G are illustration of exemplary displays on a display unit in the portable communication device of FIG. 2 at various stages of its operation.
Figure 4E:
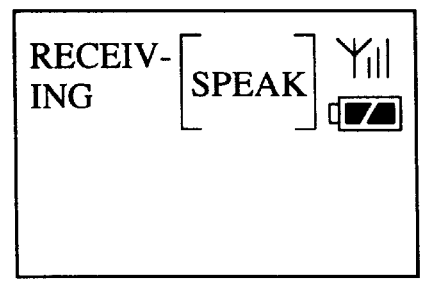
Figure 4B:
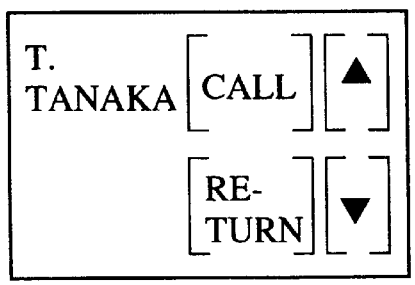
Figure 4F:
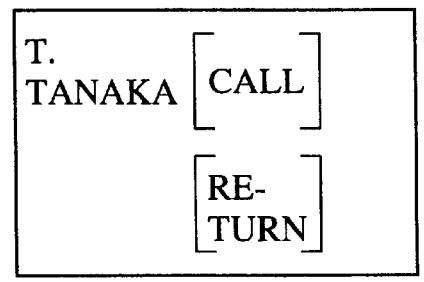
Figure 4C:
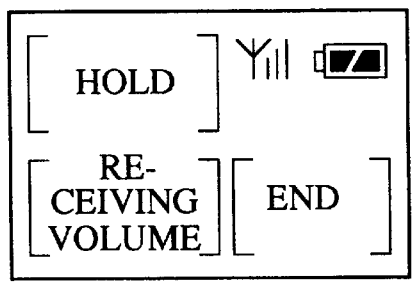
Figure 4G:
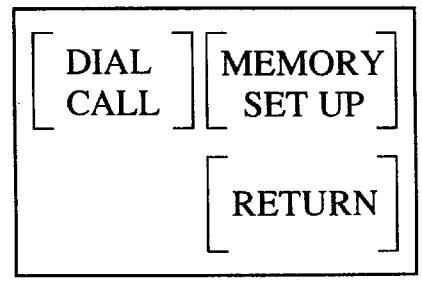
Figure 4D:
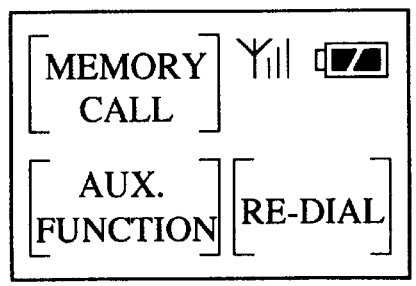

Here, FIG. 4A shows an exemplary display in an initial communication waiting state, FIG. 4B shows an exemplary display in a "memory call" state before a beginning of a communication, FIG. 4C shows an exemplary display in a speaking state (line connected state) during a communication, and FIG. 4D shows an exemplary display in a communication waiting state after a communication is ended and a line is disconnected.

When the power is turned on in the portable communication device of this first embodiment, a display on the display unit 2 is set to an initial communication waiting state as shown in FIG. 4A, which is the same as an exemplary display shown in FIG. 3. In this initial communication waiting state of FIG. 4A, the input key 1A is designated as an input key for switching the operation state into a "memory call" mode, the input key 1C is designated as an input key for switching the operation state into an "auxiliary function" mode, and the input key 1D is designated as an input key for switching the operation state into a "re-dial" mode.

Here, the "memory call" mode is an operation state for carrying out a connection of a communication line according to the destination information (ID number, telephone number, address number, etc.) stored in a memory of the portable communication device.

In a case of carrying out this "memory call", the input key 1A in the communication waiting state is operated first to switch the operation state into the "memory call" mode. In response, the display unit 2 displays the information (name information, affiliation information, or destination information associated with these, etc.) of an intended receiver side to which a communication line is to be connected now (a display of a name "T. TANAKA" as shown in FIG. 4B, for example), along with names of functions assigned to the input keys 1A to 1D in this "memory call" mode. As shown in FIG. 4B, the input key 1A is designated as a "call" key, the input key 1B is designated as an upward cursor key, the input key 1C is designated as a "return" key, and the input key 1D is designated as a downward cursor key, in this "memory call" mode.

When the input key 1B or 1D is operated, the information on a receiving side is sequentially selected and displayed from a plurality of corresponding destination information stored in a memory of the portable communication device. Then, by operating the input key 1A at a point where the information on a desired receiving side is displayed, the calling processing for connecting a communication line is started. Note that in this "memory call" mode, when the input key 1C is operated, the operation state returns to the initial communication waiting state and the "memory call" procedure can be interrupted, so that a desired state can be recovered quickly even when the operation state is switched to this "memory call" mode by accident.

In this "memory call" mode, when the "call" key is operated and the calling processing for connecting a communication line with the receiving side is started, a display on the display unit 2 is switched to that of FIG. 4C for a "speaking" mode, and the portable communication device is set into a "speaking" state (line connected state).

In this "speaking" mode, as shown in FIG. 4C, the input key 1A is designated as a "hold" key, the input key 1B is designated as an upward cursor key, the input key 1C is designated as a "receiving volume" control mode key, and the input key 1D is designated as an "end" key. When the input key 1A is operated during a communication, the portable communication device is set in a hold state, in which the communication with the receiving side is temporarily interrupted while the line remains connected. At this point, the portable communication device displays the operation state on the display unit 2 so that a user can confirm the current operation state. On the other hand, when the input key 1C is operated during a communication, the operation state is switched into a "receiving volume" control mode so that a receiving volume can be controlled desirably. At a time of ending the communication, the input key 1D is operated to disconnect the communication line.

When the communication is ended, a display on the display unit 2 returns to the communication waiting state as shown in FIG. 4D. When this communication waiting state is maintained without turning the power off, the portable communication device is set into an operation state for waiting a connection request from another user's terminal (waiting for receiving a call). In the communication waiting state of FIG. 4D, the "auxiliary function" mode is an operation state for using auxiliary functions such as "dial call", "memory setup", etc., and the "re-dial" mode is an operation state for carrying out a connection (or re-connection) of a communication line according to the destination information temporarily stored in a memory of the portable communication device (such as the destination information of the receiving side for which the last line connection procedure is carried out).

When a plurality of hierarchically ordered functions are assigned to each of a plurality of input keys in this manner, by switching the function display on the display unit 2 hierarchically according to the hierarchy level of the command input, it is possible to provide an operation environment convenient for a user in which names of functions assigned to the input keys at each hierarchy level are displayed on the display unit 2.

Also, as a plurality of functions are assigned to one input key, it is possible to reduce a physical number of input keys required in the portable communication device. For this reason, the display unit 2 can occupy an area larger than that of the input unit 1 in this portable communication device, and a compact device body to improve the portability of the portable communication device can be realized without reducing a size of each input key, i.e., without damaging the maneuverability of the portable communication device.

In addition, by means of the display for each mode, it becomes easier for a user to comprehend a state of a current operation, and it is possible for a user to enter a command input by operating a lesser number of input keys, so that there is no need for a user to learn many complicated operation procedures for any operation mode on any hierarchy level.

Furthermore, by displaying the operation state of the portable communication state, it also becomes possible for a user to easily recognize such an operation state as that in a case in which the portable communication device is not operable due to the battery power shortage, or that in a case in which the communication cannot be made as the portable communication device is located outside of the service area of the base station. In such a situation, the calling, receiving, and setting of various functions are impossible, so that this fact should be displayed in the initial communication waiting state, in order to enable a user to check whether the portable communication device is in an operable state or not easily.

Note that, in this first embodiment, it is not absolutely necessary to assign some functions to all of the input keys constituting the input unit 1. For example, as shown in FIG. 4A, a display region spatially corresponding to one input key (the input key 1B) may be used to display some other information such as a reception state (receiving field strength, etc.) of radio waves from the base station (parent station), a remaining power of the chargeable battery 7, etc.

It is also possible to limit a display region for displaying names of functions assigned to the input keys to only a part of an entire region of the display unit 2. Even in such a case, it is possible to arrange names of functions assigned to the input keys in correspondence to the spatial arrangement of the input keys, within such a limited region. For example, as shown in FIG. 4B, a region for displaying names of functions can be restricted only to a part (a right half) of the display unit 2 and names of functions can be arranged within this region in correspondences to the spatial arrangement of the input keys.

When a region for displaying names of functions is limited only to a part of the display unit 2 in this manner, it is possible to display other information specific to a current operation mode in the remaining region of the display unit 2. For example, in the "memory call" mode, the "memory call" operation can be carried out while displaying the information on the receiving side such as a name, a telephone number, etc., is displayed on the remaining region of the display unit 2, as shown in FIG. 4B.

The information on the receiving side such as a name, a telephone number, etc., displayed on the display unit 2 can be sequentially rolled upward or downward by operating the upward or downward cursor key, so that by displaying this information on a part of the display unit 2, it becomes possible to check the result of operation made by using the input keys along with names of functions assigned to the input keys, on the same display.

Note that a region to which the function display is to be limited can be set up in any desired manner, including a left side region, upper side region, lower side region, upper right region, upper left region, lower right region, and lower left region, besides the right side region shown in FIG. 4B. When a human user checks the display screen by eyes, it is common to shift the view from an upper left to the lower right, so that by limiting the function display region to the right side region of the display unit 2, it is possible to display some important operation result on the left side of the display unit 2. In general, it is possible to limit a region for displaying names of functions to any desired region depending on the operation mode, in order to make it possible for a user to check the input operation and the result easily on the display.

Next, with references to FIGS. 4E to 4G and FIG. 5 to FIG. 9, exemplary display of names of functions and a hierarchical structure of functions and a concrete input operation procedure for using functions in a case of assigning functions hierarchically to a plurality of input keys will be described in detail.

FIG. 5 shows a transition of the operation state which starts from the communication waiting state, goes to the "memory call" state to connect a communication line, and then returns to the communication waiting state again by disconnecting a communication line.

When the power is turned on in the portable communication device of this first embodiment (block 400), the portable communication device is set into the communication waiting state, and the display unit 2 displays function names such as "memory call", "aux. function" and "re-dial", and the operation state such as the radio wave reception state, the battery power state, etc. (block 401). As described above, the function name such as "memory call" indicates the function assigned to the corresponding input key 1A at the spatially corresponding position, and so on.

When the input key corresponding to the "memory call" function is operated next, the operation state of the portable communication device is switched to the "memory call" mode, and the display unit 2 displays function names such as "call" and "return", upward and downward arrowhead marks, and the information on the calling destination candidate (block 402). Here, the function names such as "call" and "return" indicate the functions assigned to the input keys 1A and 1C at the spatially corresponding positions, while the upward and downward arrowhead marks indicate the functions assigned to the input keys 1B and 1D at the spatially corresponding positions.

Next, when the input key corresponding to the "call" function is operated, the communication line connection procedure is started, and the operation state of the portable communication device is switched to the "speaking" mode. In the "speaking" mode, the display unit 2 displays function names such as "hold", "receiving volume" and "end", and the operation state such as the radio wave reception state, etc. (block 403). The function names such as "hold", "receiving volume" and "end" indicate the functions assigned to the corresponding input keys 1A, 1C and 1D, respectively.

Now, when it is desired to temporarily interrupt the communication while maintaining the connection of the communication line, the input key corresponding to the hold function is operated to switch the operation state to the "hold" mode. In the "hold" mode, the display unit 2 displays function names such as "end of hold" and the operation state such as the radio wave reception state, etc. (block 404). By operating the input key corresponding to the "end of hold" function, the operation state of the portable communication device can be switched back to the "speaking" mode so that the communication can be resumed again.

For example, in a case of carrying out some other work during the communication, or in a case of communicating with someone else by means of interrupting communication, or in a case of transferring the communication line to someone else, the operation state of the portable communication device is switched to the "hold" mode, and the music or message notifying the "hold" state is transmitted to the communication receiving side, while the transmission of the speech from a user of the portable communication device is stopped.

Also, when the input key corresponding to the "receiving volume" control function in the "speaking" mode, the operation state is switched to the "receiving volume" control mode while continuing the communication with the receiving side, and the display unit 2 displays the function names such as "setup", upward and downward arrowhead marks, and the information on the receiving volume (block 405). In the "receiving volume" control mode, the speech volume level is indicated by level expression such as large, medium and small, or by level value such as numbers 0 to 9, while the upward and downward arrowhead marks indicate the functions assigned to the input keys 1B and 1D at the spatially corresponding positions, respectively. By operating the input keys 1B and 1D, the desired receiving volume level indication is selected, and by operating the input key 1C corresponding to the "setup" function, the selected receiving volume level can be set. Also, when the input key 1C corresponding to the "setup" function is operated, the operation mode is switched from the "receiving volume" control mode to the normal "speaking " mode.

Then, by operating the input key 1D corresponding to the communication "end" function in the "speaking" mode, the communication with the receiving side is ended by disconnecting the communication line. When the communication is ended, the operation state is switched from the "speaking" mode to the communication waiting mode, and the display for the communication waiting mode is resumed (block 401).

When the "memory call" mode is selected from the communication waiting mode, the operations in the further hierarchical levels are all related to the "memory call", so that it is possible to realize the desired operation of a user easily and accurately, fully in compliance with a user's original intention.

Figure 6:
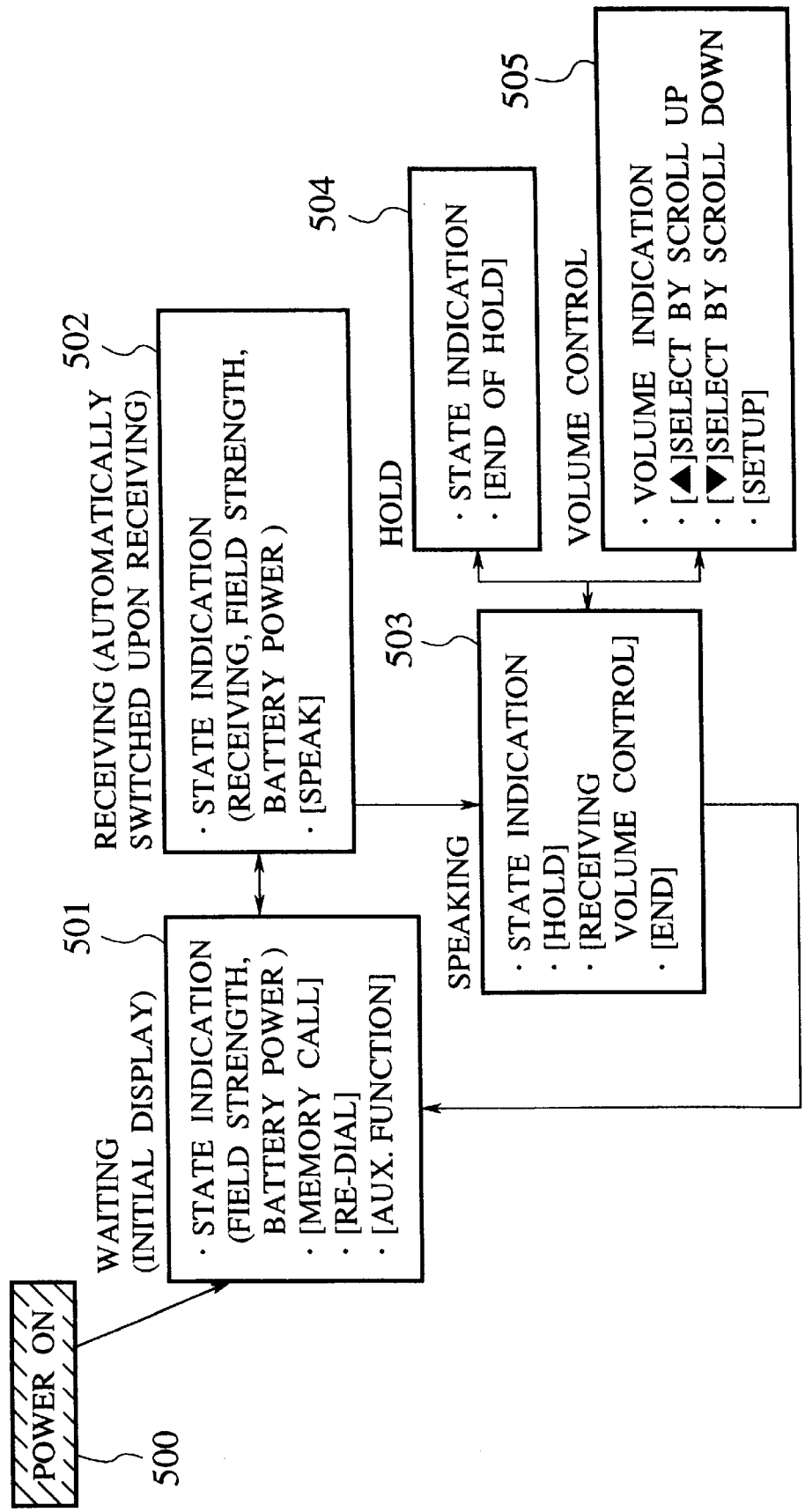
FIG. 6 is an operation state transition diagram for a case of a "receiving" operation in the portable communication device of FIG. 2.

FIG. 6 shows a transition of the operation state which starts from the communication waiting state, goes to a state of connecting a communication line in response to the communication line connection request from a calling side, and then returns to the communication waiting state again by disconnecting a communication line. Here, after the power is turned on in the portable communication device (block 500), the operation state of the portable communication device in the communication waiting mode (501) is the same as in the block 401 of FIG. 5 described above, so that it will not be described here again.

When there is a communication line connection request from a calling side, the operation state is switched to the "receiving" mode, and the display unit 2 displays function names such as "speak", an indication of the fact that a connection of the communication line is requested, and the operation state such as the radio wave reception state, the battery power state, etc. (block 502). In this "receiving" mode, an exemplary display by the display unit 2 appears as shown in FIG. 4E, in which the input key 1A corresponds to the input key for switching the operation state to the "speaking" mode.

When the input key 1A corresponding to the "speak" function is operated, the communication line with the calling side is connected, and the operation state of the portable communication device is switched to the "speaking" mode (block 503). When it is desired to temporarily interrupt the communication while maintaining the connection of the communication line, the operation state can be switched to the "hold" mode (block 504), whereas when it is desired to control the receiving volume, the operation state can be switched to the "receiving volume" control mode (block 505).

After the communication line is connected, until the communication line is disconnected by operating the input key corresponding to the communication "end" function in the "speaking" mode, the operation states of the portable communication device (blocks 503 to 505) and the display contents of the display unit 2 are similar to those of blocks 403 to 405 in FIG. 5 described above, so that they will not be described here again.

Figure 7:
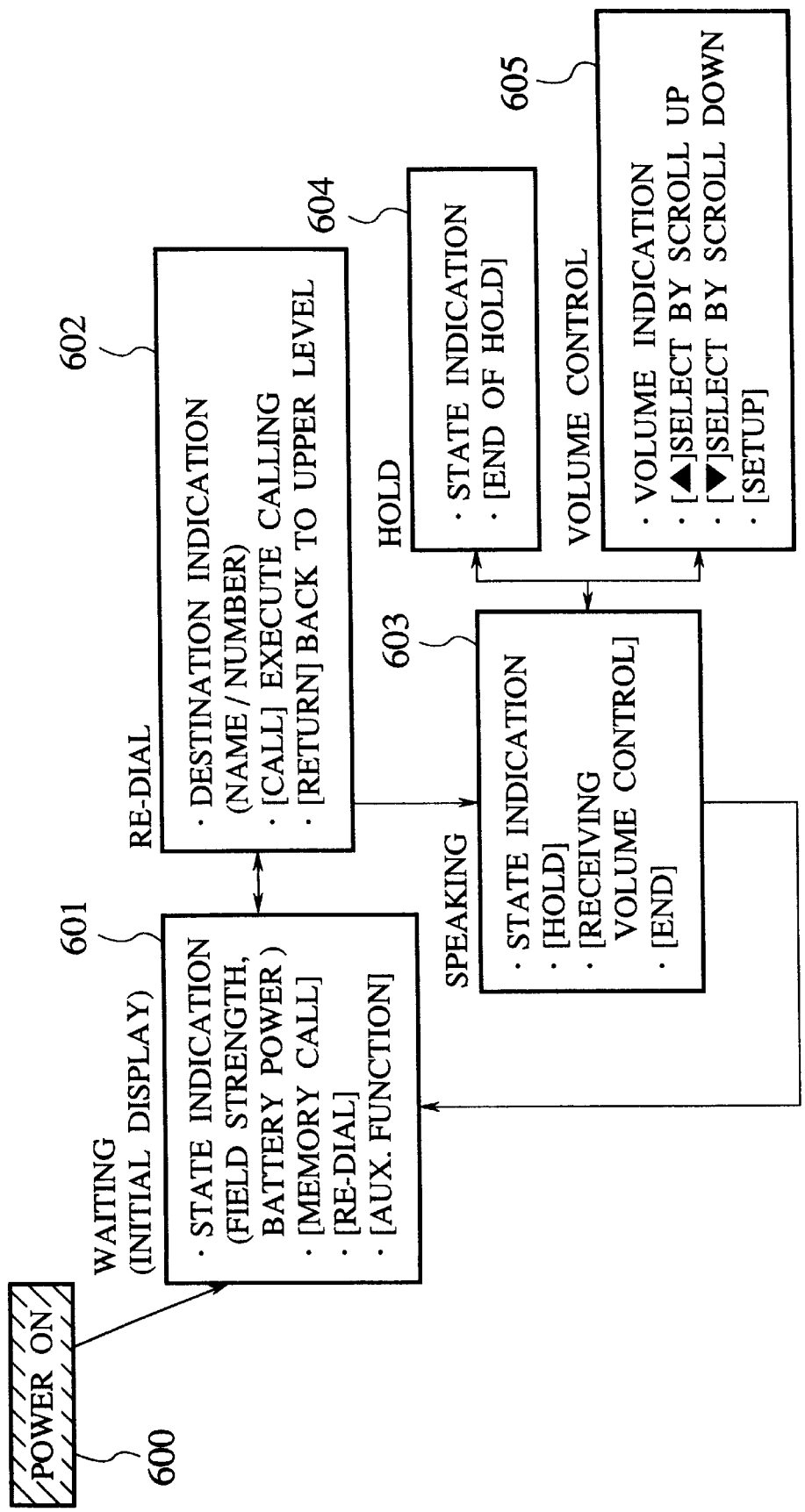
FIG. 7 is an operation state transition diagram for a case of a "re-dial" operation in the portable communication device of FIG. 2.

FIG. 7 shows a transition of the operation state which starts from the communication waiting state, goes to a state of connecting a communication line by the "re-dial" operation, and then returns to the communication waiting state again by disconnecting a communication line. Here, after the power is turned on in the portable communication device (block 600), the operation state of the portable communication device in the communication waiting mode (601) is the same as in the block 401 of FIG. 5 described above, so that it will not be described here again.

In a case of starting the communication line connection procedure again with respect to the receiving side for which the "memory call" was made last time, the operation state of the portable communication device is switched to the "re-dial" mode by operating the input key 1D corresponding to the "re-dial" function in the communication waiting state. In the "re-dial" mode, the display unit 2 displays function names such as "call" and "return", and the information on the receiving side (name information, affiliation information, ID number, telephone number, address number, destination information associated with these, etc.) for which the "memory call" was made last time (block 602). In this "re-dial" mode, an exemplary display by the display unit 2 appears as shown in FIG. 4F, in which the input key 1A corresponds to the "call" key, and the input key 1C corresponds to the "return" key.

When the input key 1A corresponding to the "call" function is operated, the communication line connection procedure with respect to the receiving side is started, and the operation state of the portable communication device is switched to the "speaking" mode (block 603). The state transition from the "speaking" mode to the "hold" mode (block 604), the state transition from the "speaking" mode to the "receiving volume" control mode (block 605), and the state transition from the "speaking" mode to the communication waiting mode (block 601) are similar to those of blocks 403 to 405 in FIG. 5 described above, so that they will not be described here again.

In this "re-dial" mode, when it was not possible to connect a communication line with a desired receiving side because the communication line to the desired receiving side was busy, or the portable communication device of the desired receiving side is located outside of the service area, or the portable communication device of the desired receiving side is inoperable due to the battery power shortage, at a time of calling the same receiving side again after some time, it is possible to carry out the "call" operation by omitting wasteful repetitive operation to enter the same information again, by storing the name and the telephone number of the receiving side for which the "call" operation was made last time in a memory of the portable communication device.

Figure 8:
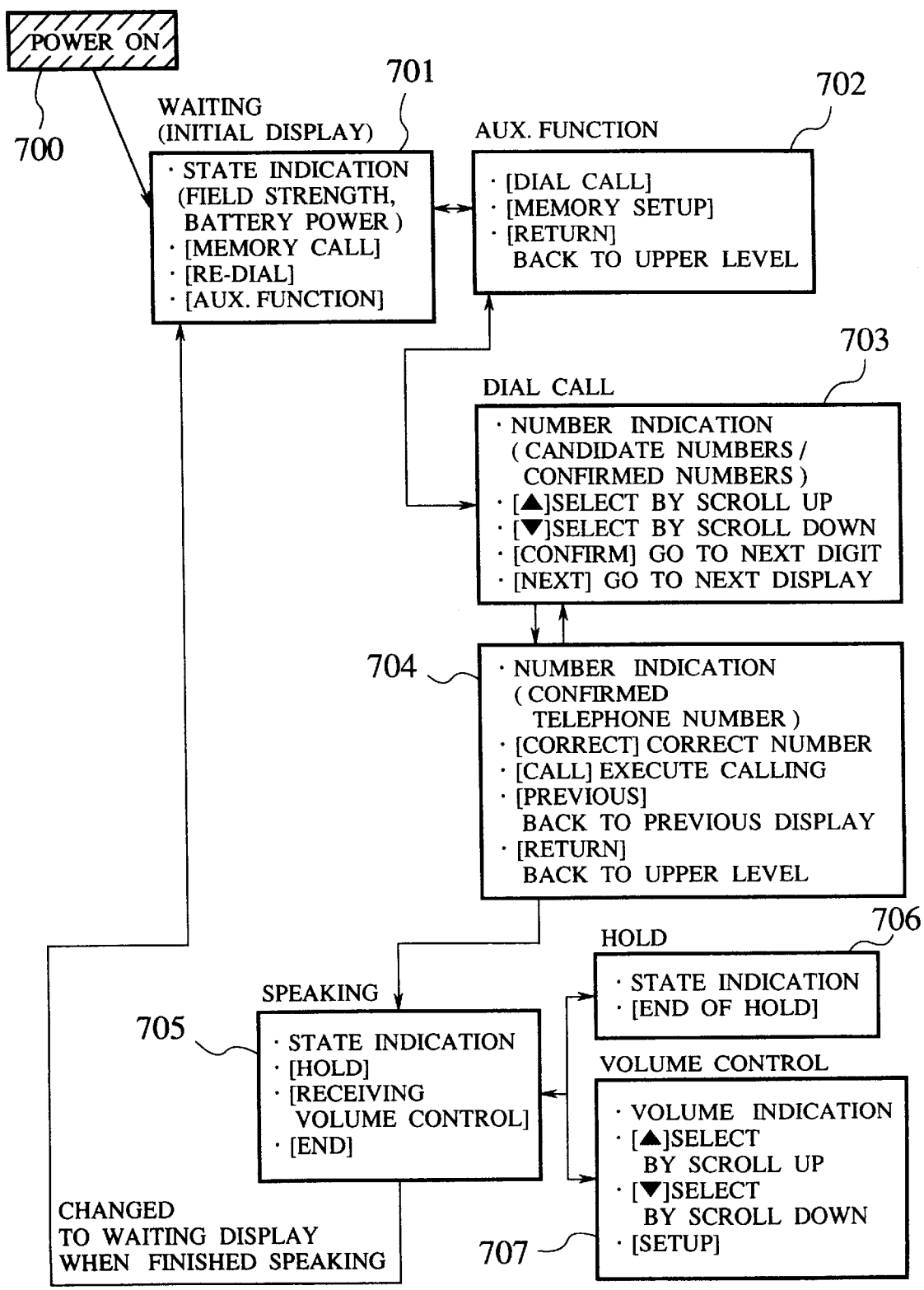
FIG. 8 is an operation state transition diagram for a case of a "dial call" operation in the portable communication device of FIG. 2.

FIG. 8 shows a transition of the operation state which starts from the communication waiting state, goes to a state of connecting a communication line by the "dial call", and then returns to the communication waiting state again by disconnecting a communication line. Here, after the power is turned on in the portable communication device (block 700), the operation state of the portable communication device in the communication waiting mode (701) is the same as in the block 401 of FIG. 5 described above, so that it will not be described here again.

At this point, when the input key corresponding to the auxiliary function is operated, the operation state of the portable communication device is switched to the "aux. function" mode, and the display unit 2 displays function names such as "dial call", "memory setup" and "return" to indicate the functions assigned to the input keys 1A, 1B and 1C at the spatially corresponding positions, respectively (block 702). In this "aux. function" mode, an exemplary display by the display unit 2 appears as shown in FIG. 4G, in which the input key 1A corresponds to the "dial call" key, the input key 1B corresponds to the "memory setup" key, and the input key 1C corresponds to the "return" key. When the "return" key is operated, for example, the operation state of the portable communication device is switched to the immediately previous operation state (i.e., the communication waiting state (block 701)).

Next, when the input key 1A corresponding to the "dial call" function is operated, the operation state of the portable communication device is switched to the "dial call" mode. In the first stage of this "dial call" mode, the display unit 2 displays function names such as "confirm", "next", etc., upward and downward arrowhead marks, and the information on the entered series of numbers (block 703).

For example, in a case of entering the telephone number, a number for the first digit of the telephone number is selected by operating the input keys corresponding to the upward and downward arrowhead marks, and then confirmed by operating the input key corresponding to the "confirm" function, and thereafter numbers for the subsequent digits are sequentially selected and confirmed similarly, so as to enter a series of numbers expressing the telephone number. When the entering of the numbers is completed, the input key corresponding to the "next" display function is operated in order to move on to the second stage of the "dial call" mode.

In the second stage of the "dial call" mode, the display unit 2 displays function names such as "correct", "call", "previous" and "return", to indicate the functions assigned to the input keys 1A, 1B, 1C and 1D at the spatially corresponding positions, respectively (block 704).

For example, when the "correct" key is operated, it is possible to re-enter the number confirmed last time among the series of numbers entered immediately previously. By means of this "correct" key, even when an erroneous number is entered in the input operation for the telephone number, it is possible to correct only an incorrectly entered number, so that there is no need to re-enter the entire series of numbers. Then, when the entering of the telephone number is completed, the "call" key is operated to carry out the call operation with respect to the receiving side specified by the entered telephone number.

By changing the hierarchical levels of the telephone number input operation of block 703 and the call operation of block 704 in this manner, it is possible to prevent the accidental execution of the call operation during the telephone number input operation causing an erroneous call. This is particularly effective in preventing the erroneous operation when a number of input keys are small as in this first embodiment.

When the input key 1A corresponding to the "call" function is operated, the dial call procedure according to the telephone number finally confirmed at the second stage is started and the communication line connection procedure is started, and the operation state of the portable communication device is switched to the "speaking" mode (block 705). When it is desired to temporarily interrupt the communication while maintaining the connection of the communication line, the operation state can be switched to the "hold" mode by operating the input key 1A corresponding to the "hold" function (block 706), whereas when it is desired to control the receiving volume, the operation state can be switched to the "receiving volume" control mode by operating the input key 1B corresponding to the "receiving volume" control function (block 707). The display contents of the display unit 2 in these operation modes are similar to those of blocks 403 to 405 in FIG. 5 described above, so that they will not be described here again.

Figure 9:
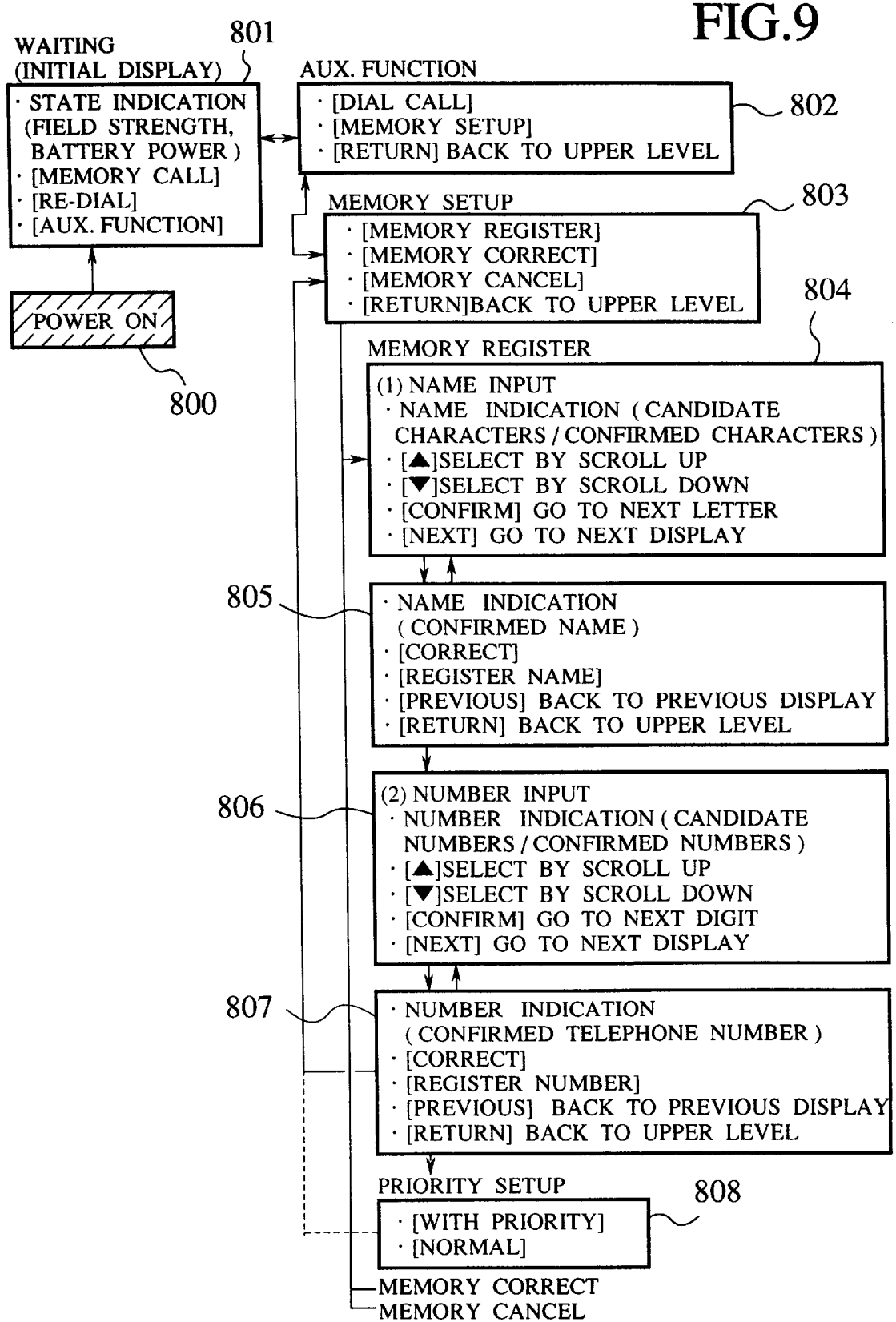
FIG. 9 is an operation state transition diagram for a case of a "memory register" operation in the portable communication device of FIG. 2.

FIG. 9 shows a transition of the operation state which starts from the communication waiting state, and goes to a state for carrying out a "memory setup" operation to register, change and/or delete the telephone number. Here, after the power is turned on in the portable communication device (block 800), the operation state of the portable communication device in the communication waiting mode (801) is the same as in the block 401 of FIG. 5 described above, so that it will not be described here again.

At this point, when the input key corresponding to the "aux. function" is operated, the operation state is switched to the "aux. function" mode, and the display unit 2 displays function names such as "dial call" (block 802). Then, when the input key corresponding to the "memory setup" function is operated, the operation state of the portable communication device is switched to the "memory setup" mode, and a display of the display unit 2 is switched to a display for the "memory setup" mode.

In the "memory setup" mode, the display unit 2 displays function names such as "memory register", "memory correct", "memory cancel" and "return", to indicate the functions assigned to the input keys at the spatially corresponding positions (block 803). Here, the input key corresponding to the "memory register" function is to be operated in a case of registering a new telephone number and destination information, the input key corresponding to the "memory correct" function is to be operated in a case of changing the already registered telephone number and destination information, and the input key corresponding to the "memory cancel" function is to be operated in a case of deleting the already registered telephone number and destination information. Also, in a case of interrupting the "memory setup" operation, the input key corresponding to the "return" key is to be operated to switch the portable communication device into the communication waiting state.

At this point, when the input key corresponding to the "memory register" function is operated, the operation state is switched to the "memory register" mode within the "memory setup" mode. This "memory register" mode generally comprises two stages of (1) destination information input mode, and (2) number input mode. First, (1) destination information input mode is the operation mode to input the information concerning the destination (name information, for example), and then (2) number input mode is the operation mode to input the telephone number necessary in connecting the communication line. In the following, an exemplary case of inputting the name information as the destination information will be described.

First, in (1) destination information input mode, the display unit 2 displays function manes such as "confirm" and "next", upward and downward arrowhead marks, and the name indication as the destination information (block 804). In a case of entering the name information, the candidate character for the first letter of the name information displayed on the display unit 2 is selected by operating the input keys corresponding to the upward and downward arrowhead marks, and confirmed by operating the input key corresponding to the "confirm" function. Thereafter, the candidate characters for the subsequent letters of the name information sequentially displayed on the display unit 2 are selected and confirmed similarly, to enter the desired name information.

Here, when the input key corresponding to the "next" display function is operated, the display unit 2 displays function names such as "correct", "register name", "previous" and "return" and the name indication for the name information entered and confirmed in the previous display (block 805). When the input key corresponding to the "register name" function is operated, for example, the name information entered and confirmed in the previous display is registered into a memory as the destination information, and the operation state is switched to (2) number input mode. Also, when the input key corresponding to the "return" function is operated, the "memory setup" procedure is interrupted, and the operation state is switched to the communication waiting state.

When the name information is registered in a memory in this manner, the operation state is switched to (2) number input mode, and the display unit 2 displays function names such as "confirm" and "next", upward and downward arrowhead marks, and the number indication as the telephone number information (block 806). In a case of entering the telephone number information, the candidate number for the first digit of the number information displayed on the display unit 2 is selected by operating the input keys corresponding to the upward and downward arrowhead marks, and confirmed by operating the input key corresponding to the "confirm" function. Thereafter, the candidate numbers for the subsequent digits of the number information sequentially displayed on the display unit 2 are selected and confirmed similarly, to enter the desired telephone name information.

At this point, when the input key corresponding to the "next" display function is operated, the display unit 2 displays function names such as "correct", "register number", "previous" and "return" and the number indication for the number information entered and confirmed in the previous display (block 807). When the input key corresponding to the "register number" function is operated, for example, the number information entered and confirmed in the previous display is registered into a memory as the telephone number information, and the "memory register" mode is finished.

When the "memory register" mode is finished, the operation state of the portable communication device is switched to the "memory setup" mode, and a display of the display unit 2 is switched to a display for the "memory setup" mode (block 803). Then, when the input key corresponding to the "return" function is operated, the operation state of the portable communication device is switched to the "aux. function" mode, and a display of the display unit 2 is switched to a display for the "aux. function" mode (block 802). Furthermore, when the input key corresponding to the "return" function is operated, the "aux. function" mode is finished, and the operation state of the portable communication device returns to the communication waiting state (block 801). By this operation, the "memory register" procedure for the destination information and the telephone number information is completed.

By registering the name information and the telephone number information for a specific receiving side into a memory in this manner, there is no need to enter the telephone number at a time of each call, and it becomes possible to complete the subsequent telephone number input by simply selecting the name information of the desired receiving side.

In addition, in the initial state, the registered contents of a memory are displayed in alphabetical order, but it is also possible to set up the priority to a specific receiving side such that the name information of the receiving side with a high priority can be displayed with a priority over the name information of the others. In this case, at a time of the "memory register", there is a need to carry out the "priority setup" (block 808). By setting up the priority, it becomes possible to carry out the calling operation quickly for a specific receiving side for which there is a need to make frequent communications, by displaying the name information for that specific receiving side with a priority. It is also possible to set up the priority order for the display of the name information according to the calling frequency or the past calling records.

Now, various other embodiments of the portable communication device according to the present invention will be described. In the following, those elements which are functionally identical to the corresponding elements in the first embodiment described above will be given the same reference numerals in the figures.

Figure 10:
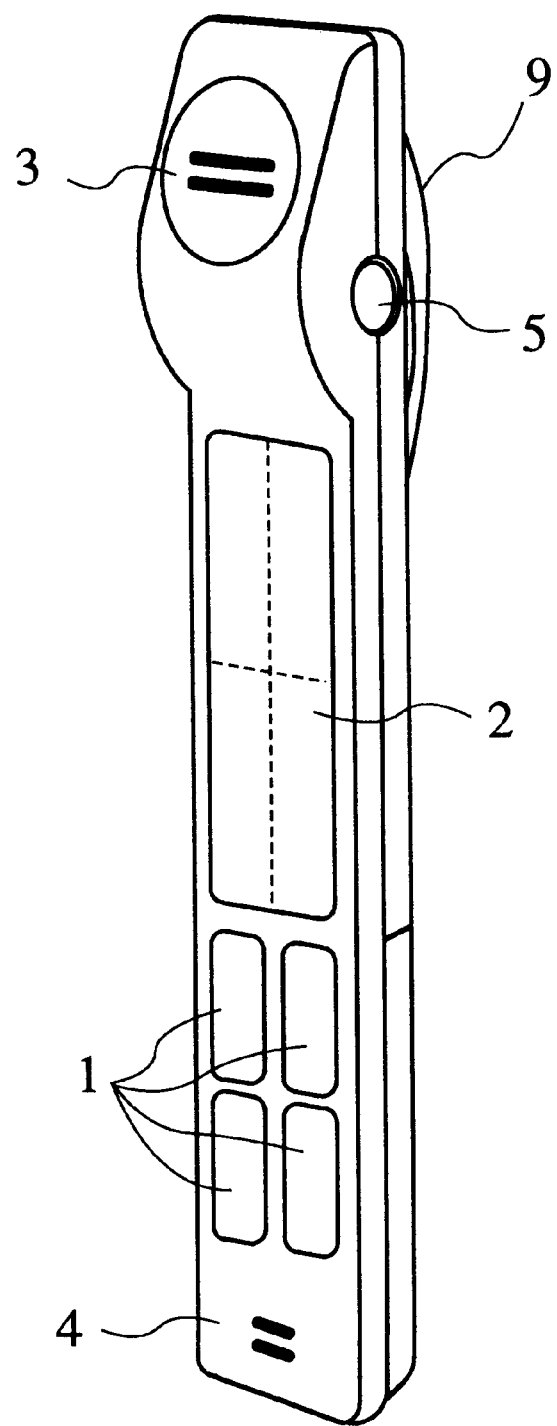
FIG. 10 is a perspective view of the second embodiment of a portable communication device according to the present invention.
Figure 11:
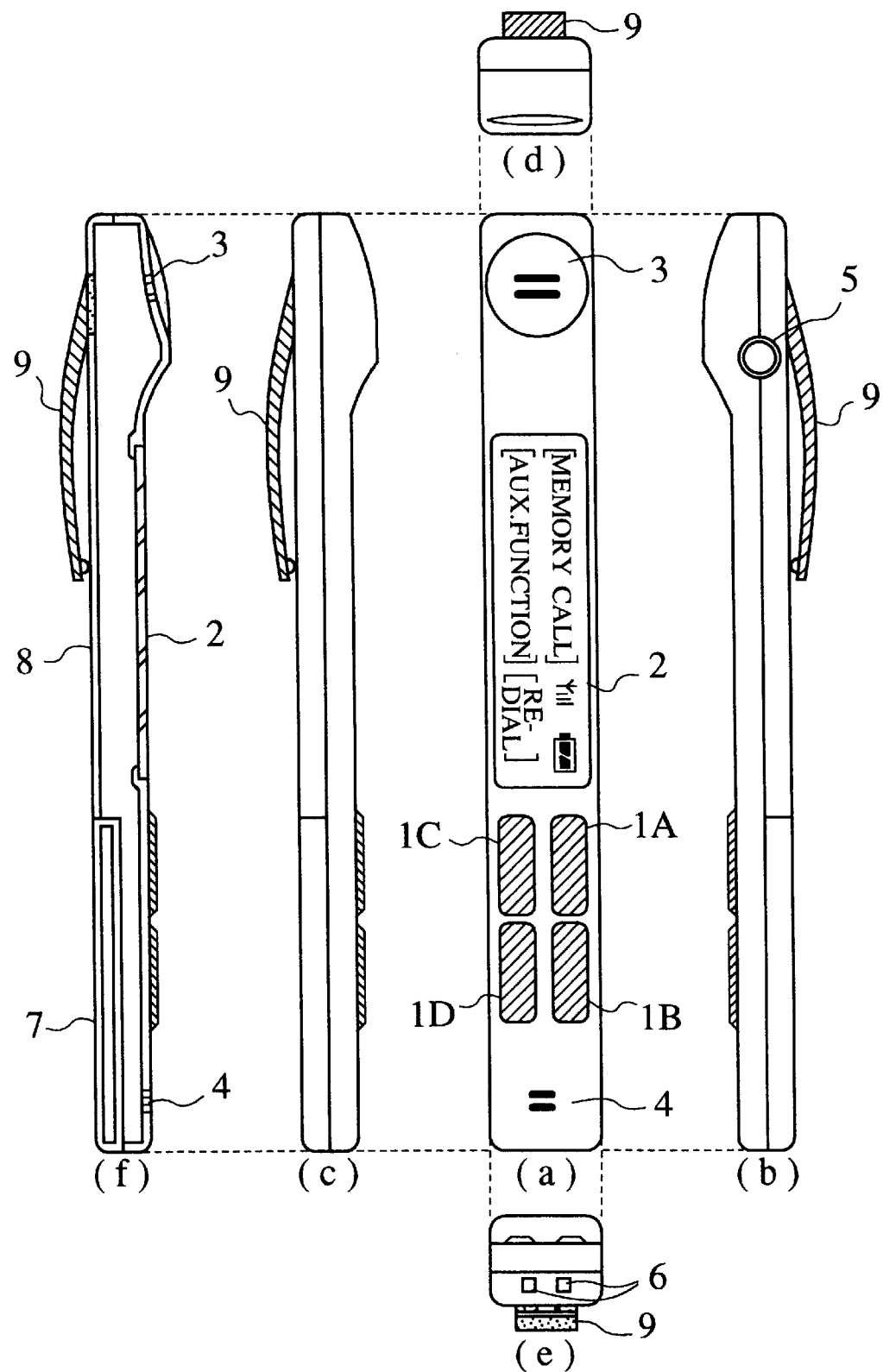
FIG. 11 is a front view, a right side view, a left side view, a top view, a bottom view, and a vertical sectional view of the portable communication device of FIG. 10.

Referring now to FIG. 10 to FIG. 12, the second embodiment of the portable communication device according to the present invention will be described in detail.

FIG. 10 shows a basic configuration of the portable communication device in the second embodiment, which comprises: an input unit 1 including four input keys, provided at a lower middle section of a device body; a display unit 2 provided at an upper middle section of a device body above the input unit 1, including four display regions for displaying functions of the input keys that are provided at spatially corresponding positions, according to an operation state of the portable communication device; a speech output unit 3 provided near an upper end of a device body; a speech input unit 4 provided near a lower end of a device body; a power switch unit 5 provided on a side of a device body; and a clip unit 9 provided on a back side of a device body.

FIG. 11 shows an external shape of the portable communication device of FIG. 10 along with an exemplary function displays on the display unit 2, where a part (a) shows a front view, a part (b) shows a right side view, a part (c) shows a left side view, a part (d) shows a top view, a part (e) shows a bottom view, and a part (f) shows a vertical sectional view. In FIG. 11, the portable communication device also includes connection terminals 6 provided on a bottom side for connection with an external battery charger, a chargeable battery 7 provided on a back side, and a transmitter-receiver 8 provided inside a device body for transmitting radio signals by converting digital speech/image transmission signals and receiving digital speech/image reception signals by converting received radio signals.

In this portable communication device of the second embodiment, four input keys 1A to 1D of the input unit 1 are arranged collectively in a vicinity the display unit 2, in a shape of 2×2 matrix, and the display unit 2 is divided into four display regions in a shape of 2×2 matrix in correspondence, so as to display names of functions assigned to the input keys 1A to 1D in an arrangement corresponding to the spatial arrangement of the input keys 1A to 1D, as shown in FIG. 10 and FIG. 11. In an exemplary display shown in FIG. 11, the input key 1A is designated as an input key for switching to the "memory call" mode, the input key 1C is designated as an input key for switching to the "aux. function" mode, and the input key 1D is designated as an input key for switching to the "re-dial" mode.

By arranging the input unit 1 and the display unit 2 at two separate areas in this manner, and controlling the display unit 2 to display names of functions assigned to the input keys in an arrangement corresponding to the spatial arrangement of the input keys, it becomes possible for a user to manipulate each input key without concealing the display of the display unit 2 by his own hand manipulating the input key, so that a convenient input key operation environment can be realized in this portable communication device.

Moreover, it is possible for the display unit 2 to occupy a larger area than the input unit 1, so that it becomes possible to display a name of a function assigned to each input key more clearly, in larger size, and therefore it becomes possible for a user to comprehend the displayed function more easily.

Furthermore, unlike a conventional portable telephone device having input keys for numbers 0 to 9 and input keys assigned with functions such as a call key, the portable communication device of the second embodiment includes a lesser number of keys to be manipulated, so that it becomes possible for a user to manipulate the input keys more easily.

Next, with references to FIGS. 12A to 12D, exemplary displays of the display unit 2 in a case of assigning a plurality of functions hierarchically to each input key in the portable communication device of this second embodiment will be described in detail.

Figure 12A:
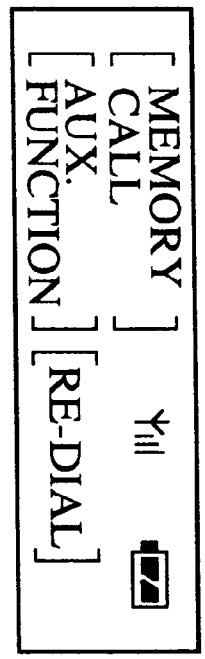
FIGS. 12A to 12D are illustration of exemplary displays on a display unit in the portable communication device of FIG. 10 at various stages of its operation.
Figure 12B:
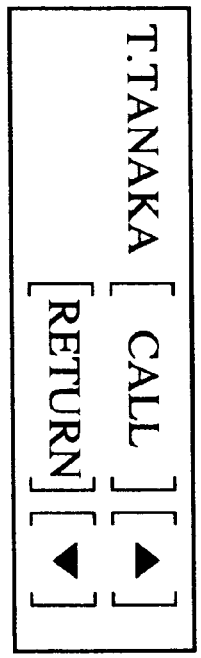
Figure 12C:
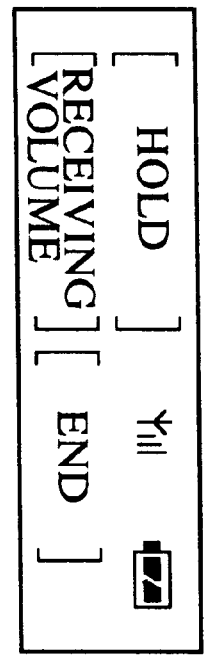
Figure 12D:
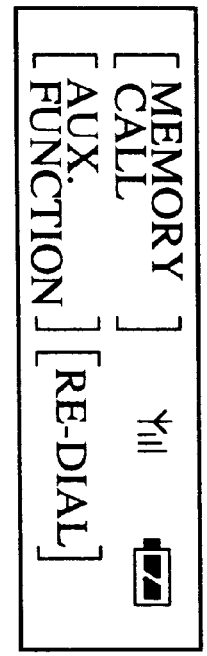

Here, FIG. 12A shows an exemplary display in an initial communication waiting state, FIG. 12B shows an exemplary display in a "memory call" state before a beginning of a communication, FIG. 12C shows an exemplary display in a speaking state (line connected state) during a communication, and FIG. 12D shows an exemplary display in a communication waiting state after a communication is ended and a line is disconnected.

When the power is turned on in the portable communication device of this second embodiment, a display on the display unit 2 is set to an initial communication waiting state as shown in FIG. 12A, which is the same as an exemplary display shown in FIG. 11. In this initial communication waiting state of FIG. 12A, the input key 1A is designated as an input key for switching the operation state into the "memory call" mode, the input key 1C is designated as an input key for switching the operation state into the "auxiliary function" mode, and the input key 1D is designated as an input key for switching the operation state into the "re-dial" mode.

The exemplary display of the display unit 2 in a case of the "memory call" mode is as shown in FIG. 12B, where the display unit 2 displays the information (name information, affiliation information, or destination information associated with these, etc.) of an intended receiver side to which a communication line is to be connected now (a display of a name "T. TANAKA" as shown in FIG. 12B, for example), along with names of functions assigned to the input keys 1A to 1D in this "memory call" mode which are arranged at positions corresponding to the spatial arrangement of the input keys 1A to 1D. As shown in FIG. 12B, the input key 1A is designated as a "call" key, the input key 1B is designated as an upward cursor key, the input key 1C is designated as a "return" key, and the input key 1D is designated as a downward cursor key, in this "memory call" mode.

The exemplary display of the display unit 2 in a case of the "speaking" mode is as shown in FIG. 12C, where the display unit 2 displays names of functions assigned to the input keys 1A to 1D in this "speaking" mode which are arranged at positions corresponding to the spatial arrangement of the input keys 1A to 1D. As shown in FIG. 12C, the input key 1A is designated as a "hold" key, the input key 1B is designated as an upward cursor key, the input key 1C is designated as a "receiving volume" control mode key, and the input key 1D is designated as an "end" key, in this "speaking" mode.

The exemplary display of the display unit 2 in a case of returning to the communication waiting state with the operation state of waiting for a connection request from another terminal (waiting for receiving a call) after the communication is ended and is as shown in FIG. 12D, where the display of the display unit 2 is similar to that of FIG. 12A.

Thus, in this second embodiment, by arranging the input unit 1 and the display unit 2 in two separate groups and controlling the display unit 2 to display a name of function assigned to each input key at a display region in spatial correspondence to each input key, it becomes possible for a user to manipulate each input key while visually confirming the function assigned to each input key, similarly as in the first embodiment described above.

Also, in this second embodiment, display unit 2 is provided in an oblong shape extending in a longitudinal (height) direction. When this portable communication device is held sideways, with the display unit 2 on the left hand side and the input unit 1 on the right hand side, this oblong display unit 2 can provide a display region extending in a transverse (width) direction which is suitable for displaying numbers and alphabets. On the other hand, when this portable communication device is held upright, with the display unit 2 on the upper side and the input unit 1 on the lower side, this oblong display unit 2 can provide a display region extending in a longitudinal (height) direction which is suitable for displaying Japanese kanji characters.

Figure 13:
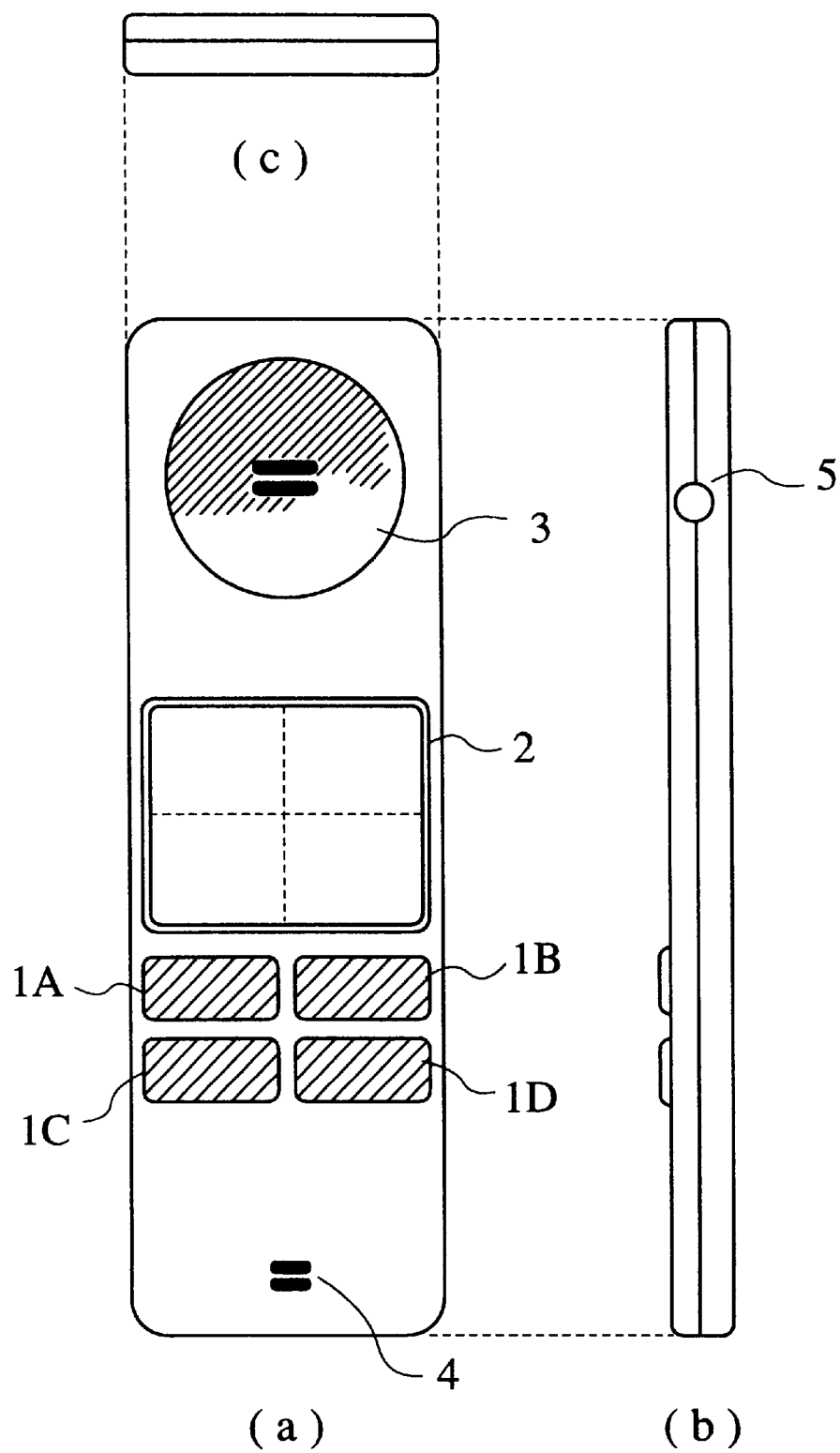
FIG. 13 is a front view, a right side view, and a top view of the third embodiment of a portable communication device according to the present invention.

Referring now to FIG. 13, the third embodiment of the portable communication device according to the present invention will be described in detail.

FIG. 13 shows a configuration of the portable communication device in the third embodiment, where a part (a) shows a front view, a part (b) shows a right side view, and a part (c) shows a top view. This configuration of FIG. 13 comprises: four input keys 1A to 1D constituting an input unit, provided at a lower middle section of a device body; a display unit 2 provided at an upper middle section of a device body above the input unit, including four display regions for displaying functions of the input keys that are provided at spatially corresponding positions, according to an operation state of the portable communication device; a speech output unit 3 provided near an upper end of a device body; a speech input unit 4 provided near a lower end of a device body; and a power switch unit 5 provided on a side of a device body.

This third embodiment differs from the first embodiment described above in that the input keys 1A to 1D are collectively arranged at an area which is spatially separated from an area of the display unit 2.

In this third embodiment, the input keys 1A to 1D are arranged collectively in a shape of 2×2 matrix, and the display unit 2 is divided into four display regions in a shape of 2×2 matrix in correspondence, so as to display names of functions assigned to the input keys 1A to 1D in an arrangement corresponding to the spatial arrangement of the input keys 1A to 1D. In this manner, it becomes possible for a user to manipulate the input keys 1A to 1D easily by a single hand, while it is also possible to form this portable communication device in a thin flat plate shape, so that the portability of the portable communication device can be improved.

Figure 14:
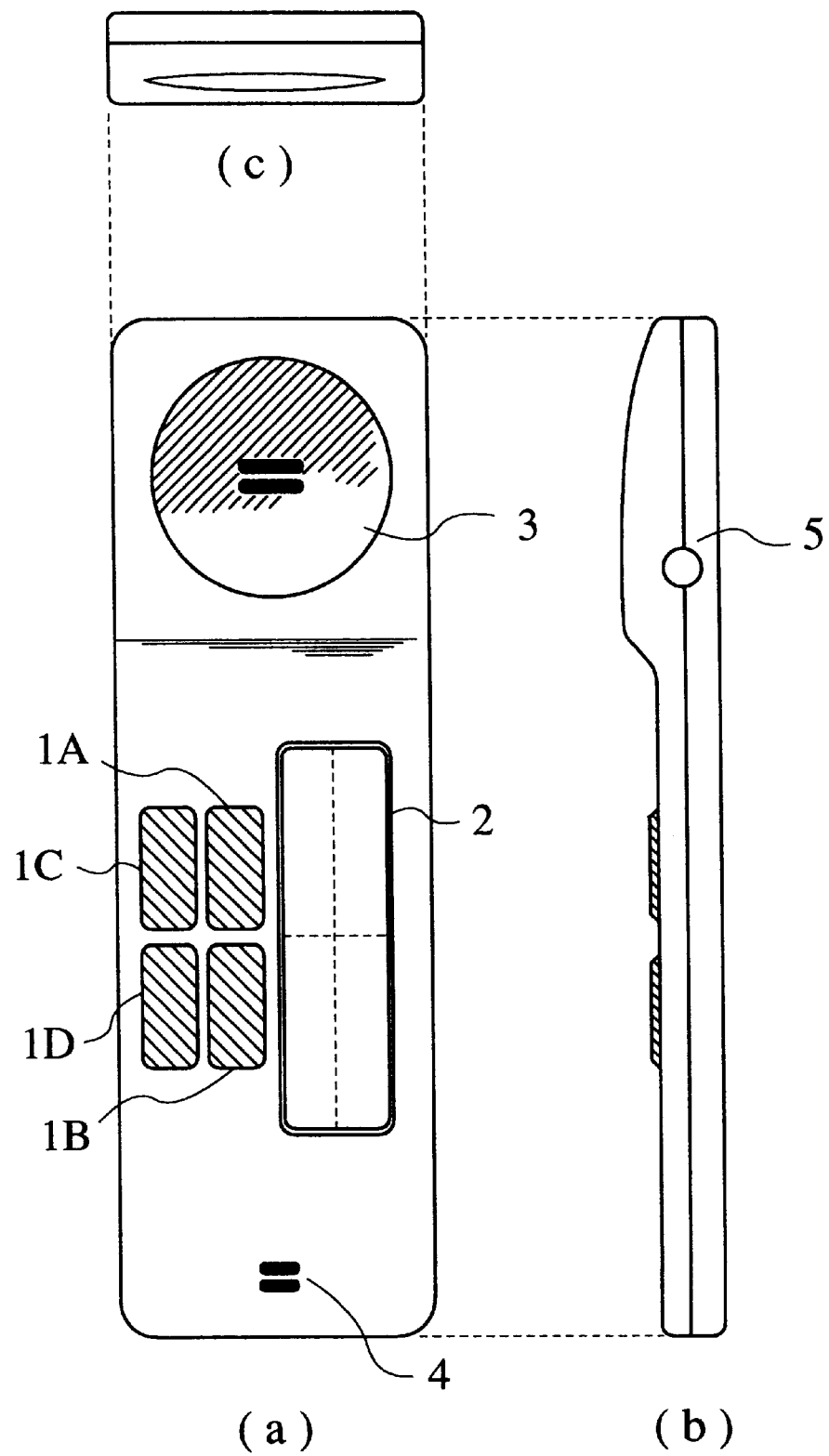
FIG. 14 is a front view, a right side view, and a top view of the fourth embodiment of a portable communication device according to the present invention.

Referring now to FIG. 14, the fourth embodiment of the portable communication device according to the present invention will be described in detail.

FIG. 14 shows a configuration of the portable communication device in the fourth embodiment, where a part (a) shows a front view, a part (b) shows a right side view, and a part (c) shows a top view. This configuration of FIG. 14 comprises: four input keys 1A to 1D constituting an input unit, provided at a left half of a middle section of a device body; a display unit 2 provided at a right half of a middle section of a device body adjacent to the input unit, including four display regions for displaying functions of the input keys that are provided at spatially corresponding positions, according to an operation state of the portable communication device; a speech output unit 3 provided near an upper end of a device body; a speech input unit 4 provided near a lower end of a device body; and a power switch unit 5 provided on a side of a device body.

This fourth embodiment differs from the first embodiment described above in that the input keys 1A to 1D are collectively arranged at an area which is spatially separated from an area of the display unit 2, similarly as in the third embodiment described above. This fourth embodiment also differs from the third embodiment described above in that the input unit and the display unit 2 are arranged adjacent to each other, at the left and right halves of a middle section of a device body, respectively, and that the speech output unit 3 has a convex shape slightly protruding from a plane of a device body.

In this fourth embodiment, the input keys 1A to 1D are arranged collectively in a shape of 2×2 matrix, and the display unit 2 is divided into four display regions in a shape of 2×2 matrix in correspondence, so as to display names of functions assigned to the input keys 1A to 1D in an arrangement corresponding to the spatial arrangement of the input keys 1A to 1D, similarly as in the third embodiment described above.

In this fourth embodiment, when this portable communication device is held upright, with the display unit 2 on the right hand side and the input unit 1 on the left hand side, it is possible for a user to manipulate the input keys 1A to 1D while holding the device body, by his left hand alone. Moreover, the display unit 2 has an oblong display region in correspondence to each input key, which is suitable for displaying one line of characters for each input key.

Moreover, by forming the speech output unit 3 in a convex shape slightly protruding from a plane of the device body, it is possible for a user to hold this portable communication device near his side face during the communication, without touching the input unit and the display unit 2 by his side face, so that it is possible to prevent the potential damaging or smearing of the portable communication device during its use.

Figure 15:
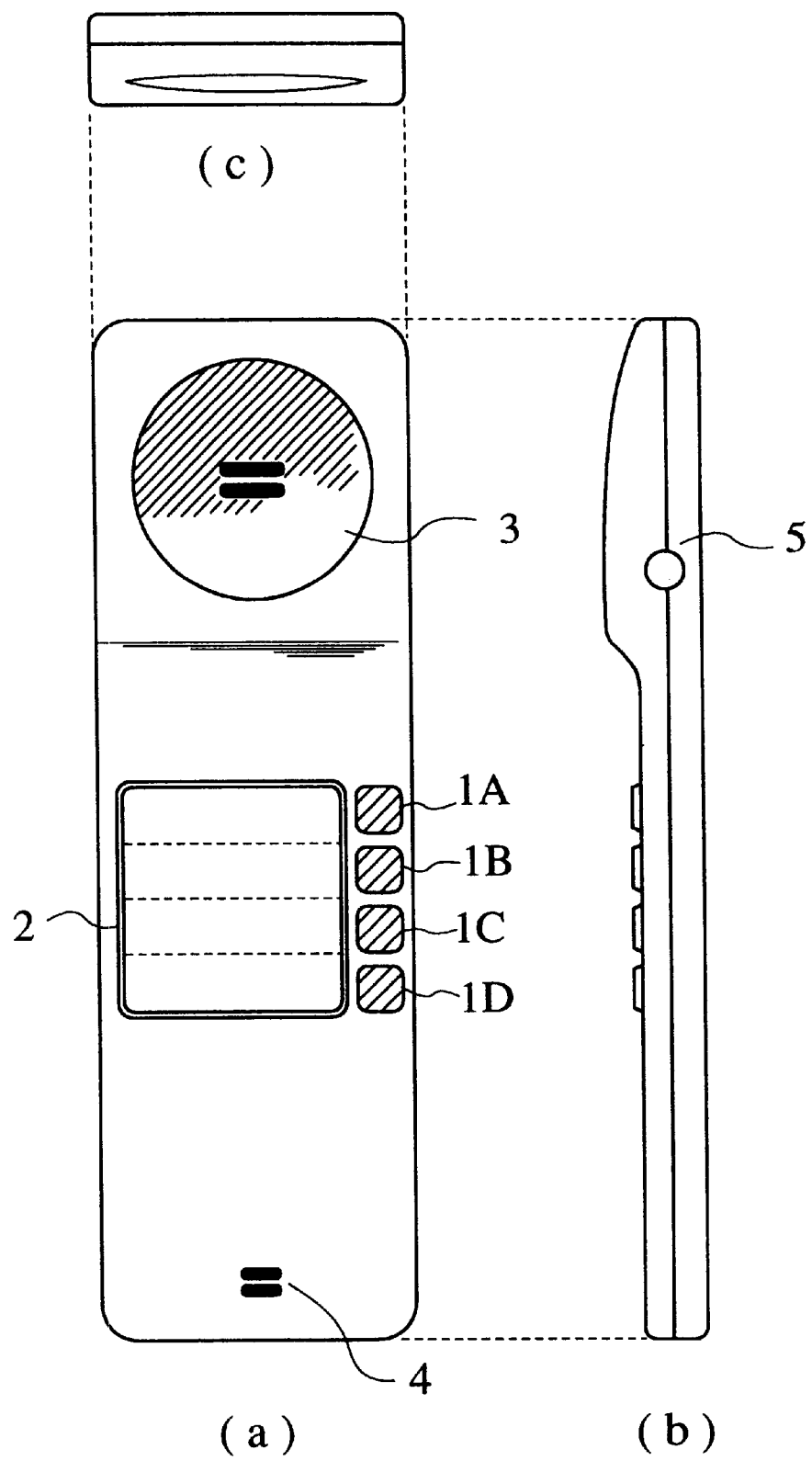
FIG. 15 is a front view, a right side view, and a top view of the fifth embodiment of a portable communication device according to the present invention.

Referring now to FIG. 15, the fifth embodiment of the portable communication device according to the present invention will be described in detail.

FIG. 15 shows a configuration of the portable communication device in the fifth embodiment, where a part (a) shows a front view, a part (b) shows a right side view, and a part (c) shows a top view. This configuration of FIG. 15 comprises: four input keys 1A to 1D constituting an input unit, provided near a right side of a middle section of a device body; a display unit 2 provided at a middle section of a device body adjacent to the input unit, including four display regions for displaying functions of the input keys that are provided at spatially corresponding positions, according to an operation state of the portable communication device; a speech output unit 3 provided near an upper end of a device body; a speech input unit 4 provided near a lower end of a device body; and a power switch unit 5 provided on a side of a device body.

This fifth embodiment differs from the first embodiment described above in that the input keys 1A to 1D are collectively arranged at an area which is spatially separated from an area of the display unit 2, similarly as in the third embodiment described above. This fifth embodiment also differs from the third embodiment described above in that the input unit and the display unit 2 are arranged adjacent to each other, at a middle section of a device body, and that the speech output unit 3 has a convex shape slightly protruding from a plane of a device body, similarly as in the fourth embodiment described above. Moreover, this fifth embodiment also differs from the fourth embodiment described above in that the input keys 1A to 1D are arranged as a single column in a longitudinal (height) direction along a side of the device body, and the display unit 2 is divided into four display regions arranged in a longitudinal (height) direction in correspondence, so as to display names of functions assigned to the input keys 1A to 1D in an arrangement corresponding to the spatial arrangement of the input keys 1A to 1D.

In this fifth embodiment, each display region of the display unit 2 is arranged immediately next to the corresponding input key, so that the correspondence between the display regions of the display unit 2 and the input keys 1A to 1D becomes intuitively obvious to a user.

Figure 16:
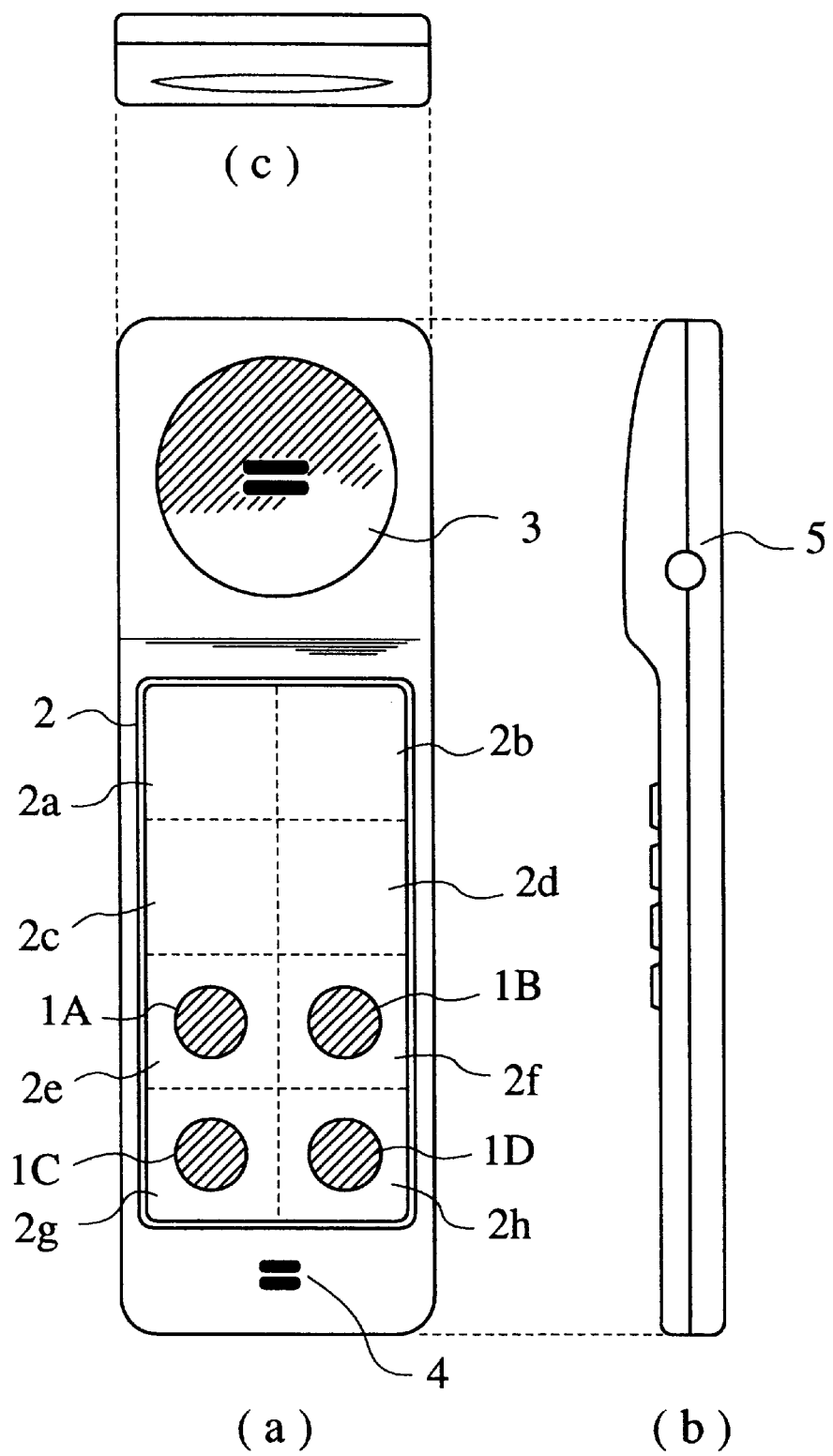
FIG. 16 is a front view, a right side view, and a top view of the sixth embodiment of a portable communication device according to the present invention.

Referring now to FIG. 16, the sixth embodiment of the portable communication device according to the present invention will be described in detail.

FIG. 16 shows a configuration of the portable communication device in the sixth embodiment, where a part (a) shows a front view, a part (b) shows a right side view, and a part (c) shows a top view. This configuration of FIG. 16 comprises: a display unit 2 provided at a middle section of a device body, which is formed by display members 2a to 2h capable of sensing a touch by a human being or a pressure exerted on a surface such as a touch panel, including lower four display members 2e to 2h functioning as four input keys 1A to 1D constituting an input unit and upper four display members 2a to 2d functioning as four display regions for displaying functions of the input keys that are provided at spatially corresponding positions, according to an operation state of the portable communication device; a speech output unit 3 provided near an upper end of a device body; a speech input unit 4 provided near a lower end of a device body; and a power switch unit 5 provided on a side of a device body.

In this sixth embodiment, the input keys 1A to 1D are collectively arranged at an area which is spatially separated from an area of the display regions of the display unit 2. Here, the display members 2e to 2h functioning as the input keys 1A to 1D are displaying pictures of buttons representing the input keys 1A to 1D, while the display members 2a to 2*d* are controlled to display names of functions assigned to the input keys 1A to 1D. In FIG. 16, the display members 2*e* to 2*h* functioning as the input keys 1A to 1D are arranged collectively in a shape of 2×2 matrix, and the display members 2*a* to 2*d* functioning as the display regions of the display unit 2 are arranged collectively in a shape of 2×2 matrix in correspondence, so as to display names of functions assigned to the input keys 1A to 1D in an arrangement corresponding to the spatial arrangement of the input keys 1A to 1D.

Also, in this sixth embodiment, the input unit and the display unit are both formed by the display members of the same type constituting a single touch panel, so that the correspondence between the display regions of the display unit 2 and the input keys 1A to 1D becomes easily comprehensible to a user and it becomes possible to display a name of a function assigned to each input key more clearly, in larger size. Moreover, as the physically separate input key members are unnecessary, it is possible to form a compact and light weight portable communication device.

Note that the role of the display members 2*a* to 2*d* and the role of the display members 2*e* to 2*h* in FIG. 16 may be interchanged so that the display members 2*a* to 2*d* function as the input keys of the input unit while the display members 2*e* to 2*h* function as the display regions of the display unit. It is also possible to divide the display members 2*a* to 2*h* into a right hand side group and a left hand side group so that the display members 2*a*, 2*c*, 2*e* and 2*g* function as the input keys of the input unit while the display members 2*b*, 2*d*, 2*f* and 2*h* function as the display regions of the display unit, or vice versa.

It is also noted that FIG. 16 shows a case in which every display member occupies the same area, but it is not necessary for the display member functioning as the input key and the display member functioning as the display region to have the same area. For instance, the display member functioning as the display region may occupy a larger area than the display member functioning as the input key so that it becomes possible to display a name of a function assigned to each input key more clearly, in larger size.

Figure 17:
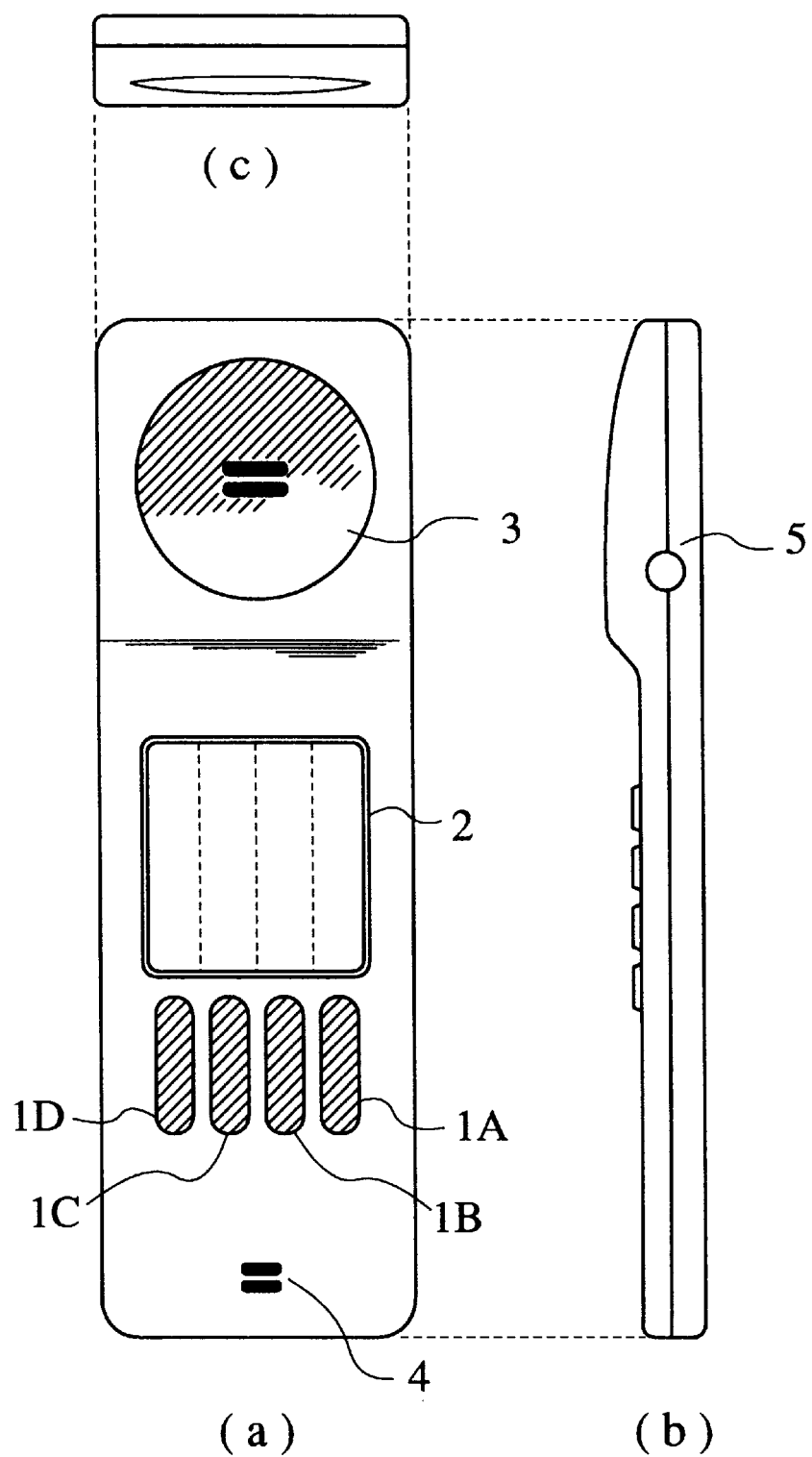
FIG. 17 is a front view, a right side view, and a top view of the seventh embodiment of a portable communication device according to the present invention.

Referring now to FIG. 17, the seventh embodiment of the portable communication device according to the present invention will be described in detail.

FIG. 17 shows a configuration of the portable communication device in the seventh embodiment, where a part (a) shows a front view, a part (b) shows a right side view, and a part (c) shows a top view. This configuration of FIG. 17 comprises: four input keys 1A to 1D constituting an input unit, provided at a lower middle section of a device body; a display unit 2 provided at an upper middle section of a device body above the input unit, including four display regions for displaying functions of the input keys that are provided at spatially corresponding positions, according to an operation state of the portable communication device; a speech output unit 3 provided near an upper end of a device body; a speech input unit 4 provided near a lower end of a device body; and a power switch unit 5 provided on a side of a device body.

This seventh embodiment differs from the first embodiment described above in that the input keys 1A to 1D are collectively arranged at an area which is spatially separated from an area of the display unit 2, similarly as in the third embodiment described above. This seventh embodiment also differs from the fifth embodiment described above in that the input keys 1A to 1D are arranged as a single row in a transverse (width) direction across the device body, and the display unit 2 is divided into four display regions arranged in a transverse (width) direction in correspondence, so as to display names of functions assigned to the input keys 1A to 1D in an arrangement corresponding to the spatial arrangement of the input keys 1A to 1D.

In this seventh embodiment, each display region of the display unit 2 is arranged immediately above the corresponding input key, so that the correspondence between the display regions of the display unit 2 and the input keys 1A to 1D becomes intuitively obvious to a user, and it becomes possible for a user to manipulate the input keys 1A to 1D easily by a single hand.

Figure 18:
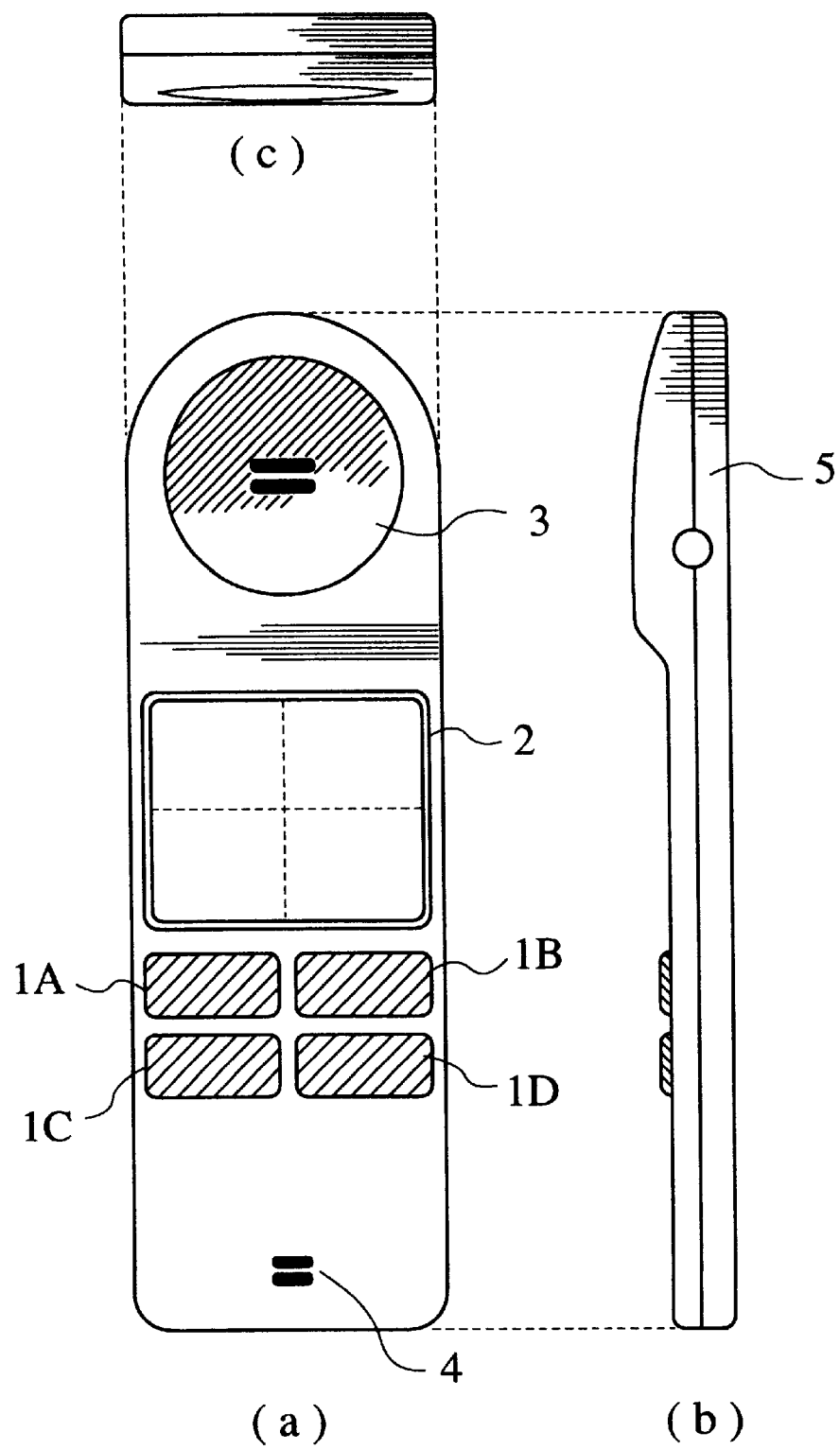
FIG. 18 is a front view, a right side view, and a top view of the eighth embodiment of a portable communication device according to the present invention.

Referring now to FIG. 18, the eighth embodiment of the portable communication device according to the present invention will be described in detail.

FIG. 18 shows a configuration of the portable communication device in the eighth embodiment, where a part (a) shows a front view, a part (b) shows a right side view, and a part (c) shows a top view. This configuration of FIG. 14 comprises: four input keys 1A to 1D constituting an input unit, provided at a lower middle section of a device body; a display unit 2 provided at an upper middle section of a device body above the input unit, including four display regions for displaying functions of the input keys that are provided at spatially corresponding positions, according to an operation state of the portable communication device; a speech output unit 3 provided near an upper end of a device body; a speech input unit 4 provided near a lower end of a device body; and a power switch unit 5 provided on a side of a device body.

This eighth embodiment differs from the first embodiment described above in that the input keys 1A to 1D are collectively arranged at an area which is spatially separated from an area of the display unit 2, similarly as in the third embodiment described above. This eighth embodiment also differs from the third embodiment described above in that the device body has a semi-circular upper end shape, and that the speech output unit 3 has a convex shape slightly protruding from a plane of a device body.

With this configuration of FIG. 18, when this portable communication device is carried around by being stored inside a bag carried by a user or a pocket of a cloth worn by a user, it becomes possible to take out this portable communication device from a bag or a pocket smoothly.

Figure 19:
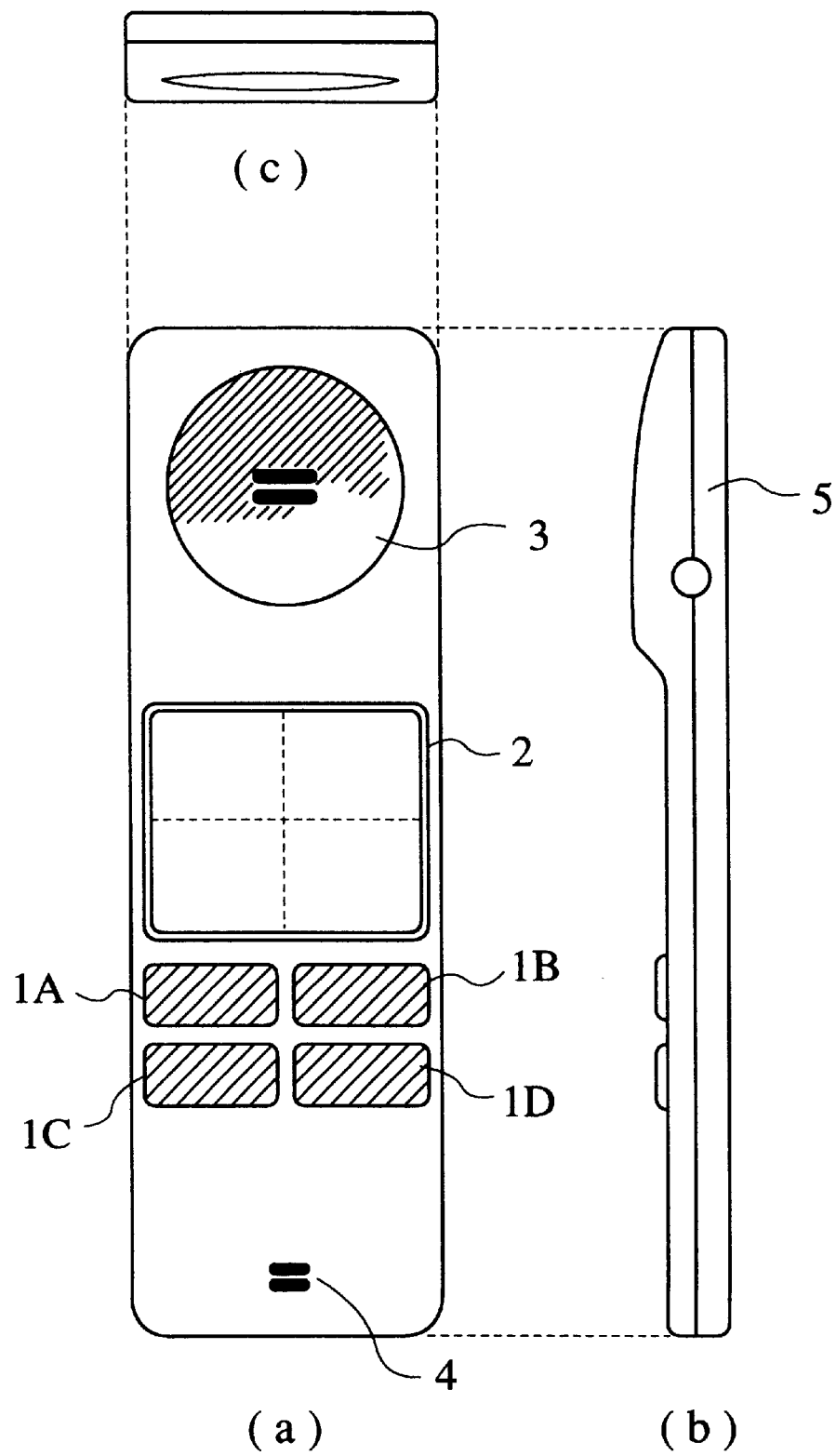
FIG. 19 is a front view, a right side view, and a top view of the ninth embodiment of a portable communication device according to the present invention.

Referring now to FIG. 19, the ninth embodiment of the portable communication device according to the present invention will be described in detail.

FIG. 19 shows a configuration of the portable communication device in the ninth embodiment, where a part (a) shows a front view, a part (b) shows a right side view, and a part (c) shows a top view. This configuration of FIG. 19 comprises: four input keys 1A to 1D constituting an input unit, provided at a lower middle section of a device body; a display unit 2 provided at an upper middle section of a device body above the input unit, including four display regions for displaying functions of the input keys that are provided at spatially corresponding positions, according to an operation state of the portable communication device; a speech output unit 3 provided near an upper end of a device body; a speech input unit 4 provided near a lower end of a device body; and a power switch unit 5 provided on a side of a device body.

This ninth embodiment differs from the first embodiment described above in that the input keys 1A to 1D are collectively arranged at an area which is spatially separated from an area of the display unit 2, similarly as in the third embodiment described above. This ninth embodiment also differs from the third embodiment described above in that the speech output unit 3 has a convex shape slightly protruding from a plane of a device body.

Here, by forming the speech output unit 3 in a convex shape slightly protruding from a plane of the device body, it is possible for a user to hold this portable communication device near his side face during the communication, without touching the input unit and the display unit 2 by his side face, so that it is possible to prevent the potential damaging or smearing of the portable communication device during its use.

Figure 20:
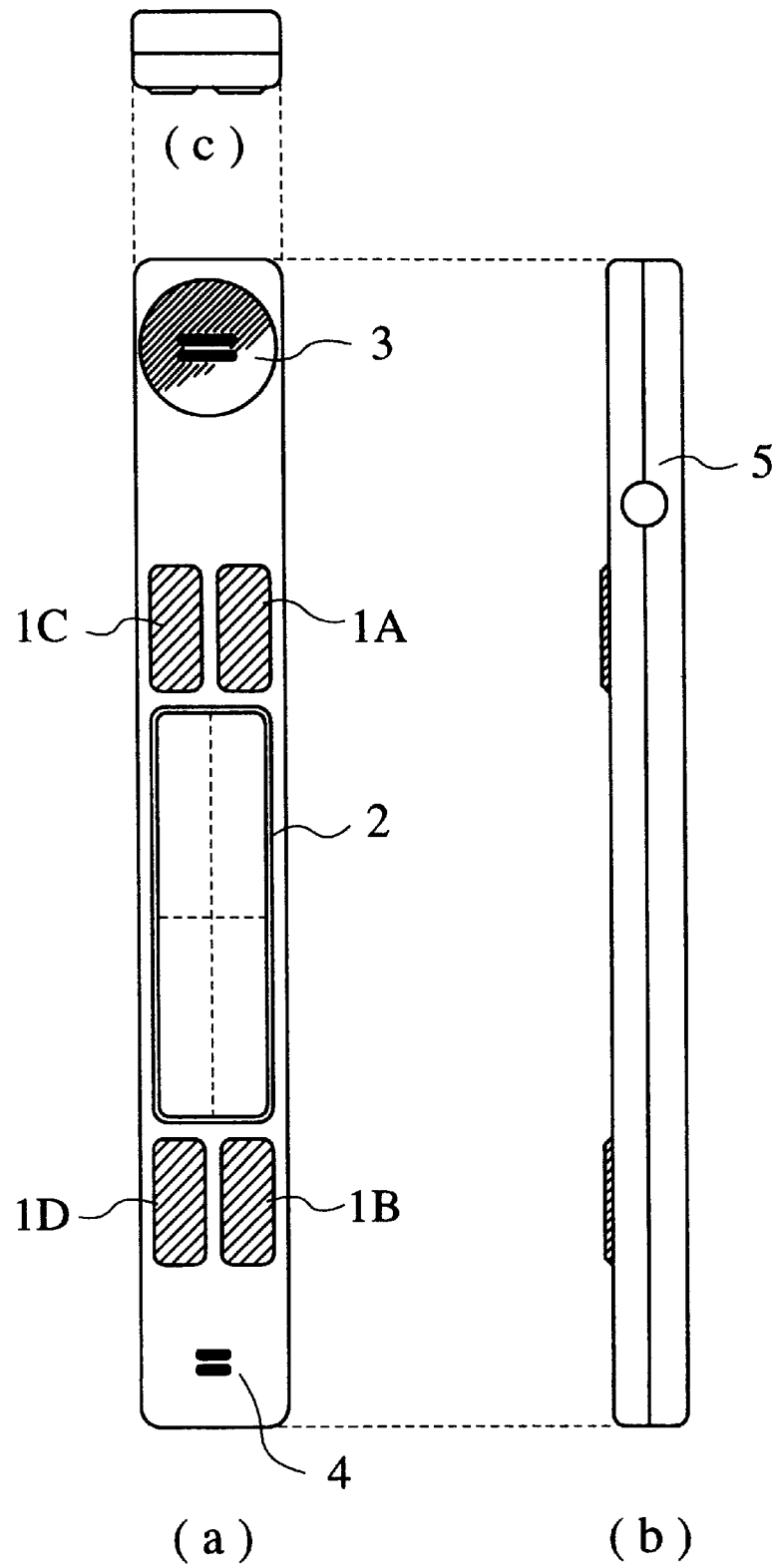
FIG. 20 is a front view, a right side view, and a top view of the tenth embodiment of a portable communication device according to the present invention.

Referring now to FIG. 20, the tenth embodiment of the portable communication device according to the present invention will be described in detail.

FIG. 20 shows a configuration of the portable communication device in the tenth embodiment, where a part (a) shows a front view, a part (b) shows a right side view, and a part (c) shows a top view. This configuration of FIG. 20 comprises: four input keys 1A to 1D constituting an input unit, provided at a middle section of a device body; a display unit 2 provided at a middle section of a device body and surrounded by the input keys of the input unit, including four display regions for displaying functions of the input keys that are provided at spatially corresponding positions, according to an operation state of the portable communication device; a speech output unit 3 provided near an upper end of a device body; a speech input unit 4 provided near a lower end of a device body; and a power switch unit 5 provided on a side of a device body.

In this tenth embodiment, four input keys 1A to 1D of the input unit are arranged around the display unit 2, the input keys 1A and 1B above the display unit 2 and the input keys 1C and 1D below the display unit 2 as shown in FIG. 20, similarly as in the first embodiment described above. The display unit 2 is divided into four display regions in an arrangement corresponding to the spatial arrangement of the input keys, where each display region displays a name of a function assigned to the corresponding input key.

This tenth embodiment differs from the first embodiment described above in that the device body is shaped in a slender form in which the transverse length (width) of the device body is shorter than that of the first embodiment while the longitudinal length (height) of the device body is the same as in the first embodiment, similarly as in the second embodiment described above. This tenth embodiment differs from the second embodiment described above in that the input keys are provided in two areas, above and below the display unit 2. This tenth embodiment also differs from the second embodiment described above in that the speech output unit 3 has a flat shape contained on the same plane as a plane of a surface of the device body.

With this configuration of FIG. 20 in a slender form, it is possible to realize the portable communication device with an improved portability which is suitable for carrying around by being stored inside a bag carried by a user or a pocket of a cloth worn by a user. Moreover, by arranging the input keys above and below the display unit 2, each display region of the display unit 2 can be arranged at an immediate vicinity of the corresponding input key, so that the correspondence between the display regions of the display unit 2 and the input keys 1A to 1D becomes obvious to a user.

Figure 21:
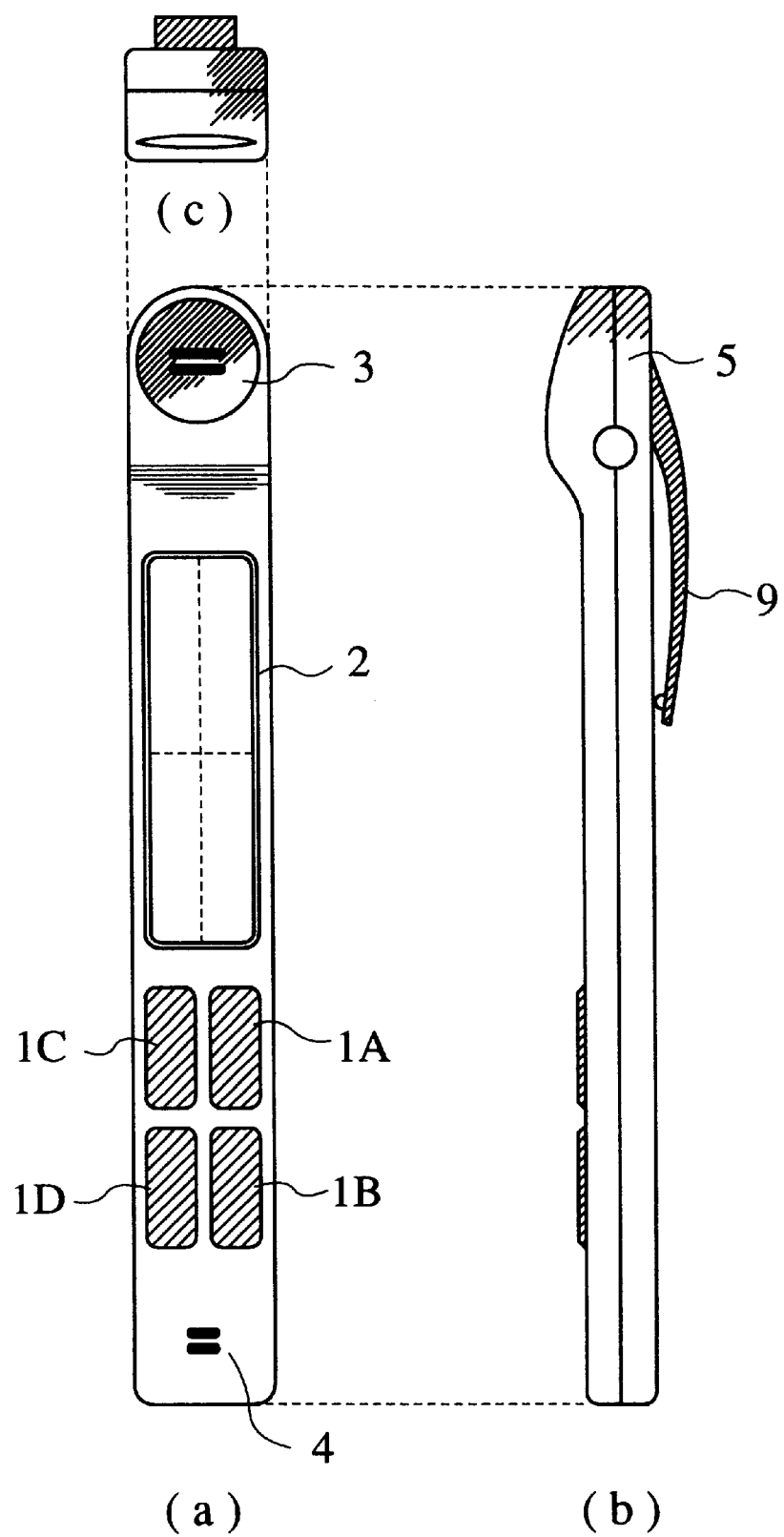
FIG. 21 is a front view, a right side view, and a top view of the eleventh embodiment of a portable communication device according to the present invention.

Referring now to FIG. 21, the eleventh embodiment of the portable communication device according to the present invention will be described in detail.

FIG. 21 shows a configuration of the portable communication device in the eleventh embodiment, where a part (a) shows a front view, a part (b) shows a right side view, and a part (c) shows a top view. This configuration of FIG. 21 comprises: four input keys 1A to 1D constituting an input unit, provided at a lower middle section of a device body; a display unit 2 provided at an upper middle section of a device body above the input unit, including four display regions for displaying functions of the input keys that are provided at spatially corresponding positions, according to an operation state of the portable communication device; a speech output unit 3 provided near an upper end of a device body; a speech input unit 4 provided near a lower end of a device body; a power switch unit 5 provided on a side of a device body; and a clip unit 9 provided on a back side of a device body.

This eleventh embodiment differs from the second embodiment described above in that the device body has a semi-circular upper end shape, but similar to the second embodiment described above in that the input keys 1A to 1D are collectively arranged at an area which is spatially separated from an area of the display unit 2, and that the device body is shaped in a slender form in which the transverse length (width) of the device body is shorter than that of the first embodiment while the longitudinal length (height) of the device body is the same as in the first embodiment.

With this configuration of FIG. 21 in a slender form, it is possible to realize the portable communication device with an improved portability which is suitable for carrying around by being stored inside a bag carried by a user or a pocket of a cloth worn by a user. Moreover, by arranging the input keys immediately below the display unit 2, it becomes possible for the user to manipulate the input keys easily while holding the device body by a single hand alone. In addition, the display unit 2 has an oblong display region in correspondence to each input key, which is suitable for displaying one line of characters for each input key.

Figure 22:
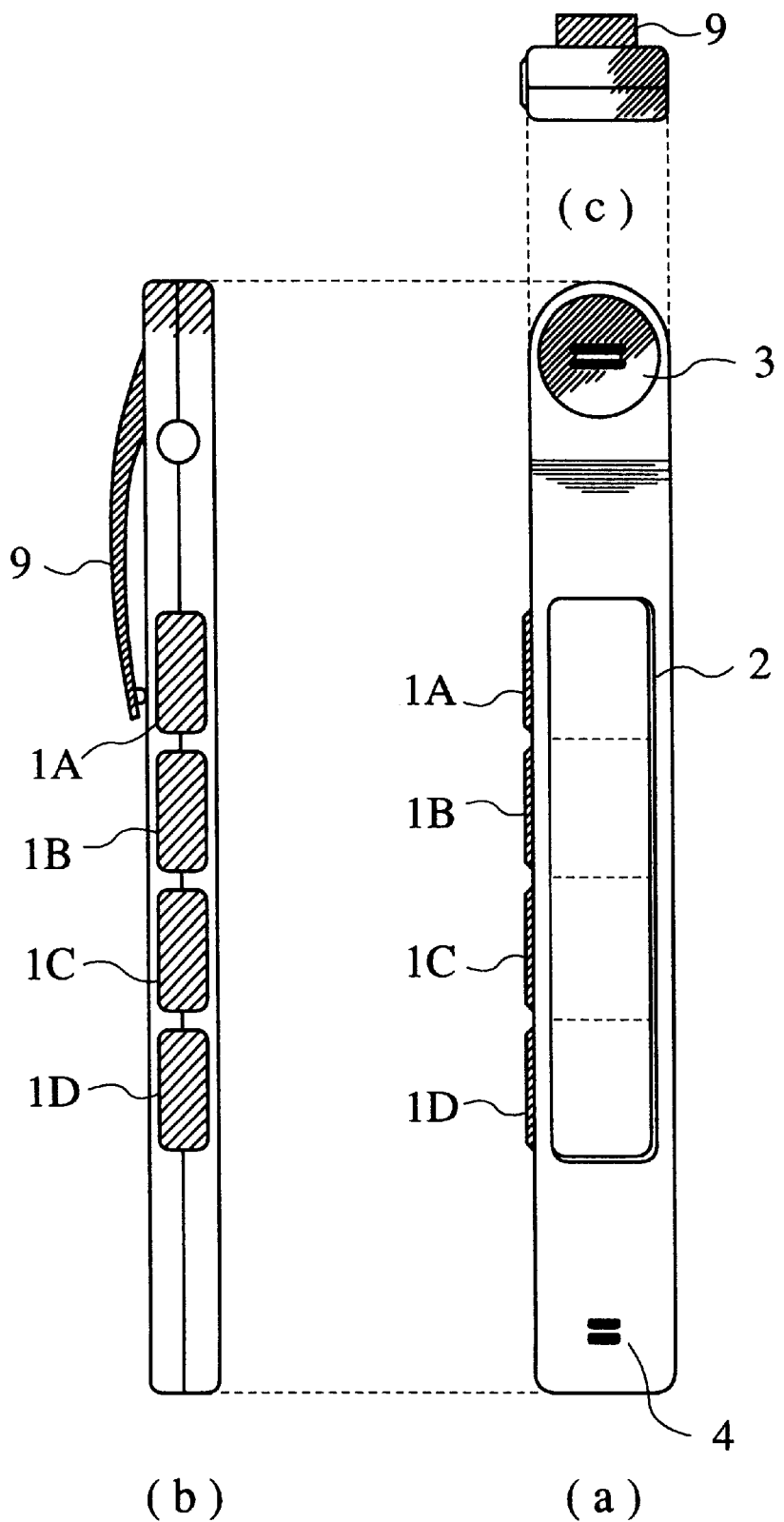
FIG. 22 is a front view, a left side view, and a top view of the twelfth embodiment of a portable communication device according to the present invention.

Referring now to FIG. 22, the twelfth embodiment of the portable communication device according to the present invention will be described in detail.

FIG. 22 shows a configuration of the portable communication device in the twelfth embodiment, where a part (a) shows a front view, a part (b) shows a left side view, and a part (c) shows a top view. This configuration of FIG. 22 comprises: four input keys 1A to 1D constituting an input unit, provided on a side of a device body; a display unit 2 provided at a middle section of a device body corresponding to the position of the input unit on a side of a device body, including four display regions for displaying functions of the input keys that are provided at spatially corresponding positions, according to an operation state of the portable communication device; a speech output unit 3 provided near an upper end of a device body; a speech input unit 4 provided near a lower end of a device body; and a clip unit 9 provided on a back side of a device body.

In this twelfth embodiment, the display unit 2 and the input keys 1A to 1D are provided on different surfaces of the device body, so that a frontal area of the device body can be reduced to make a compact portable communication device.

Note that, alternatively, it is also possible to arrange the input unit at a middle section of the device body on the same side as the speech output unit 3 and the speech input unit 4, while the display unit 2 is arranged on a side of the device body corresponding to the position of the input unit.

Figure 23:
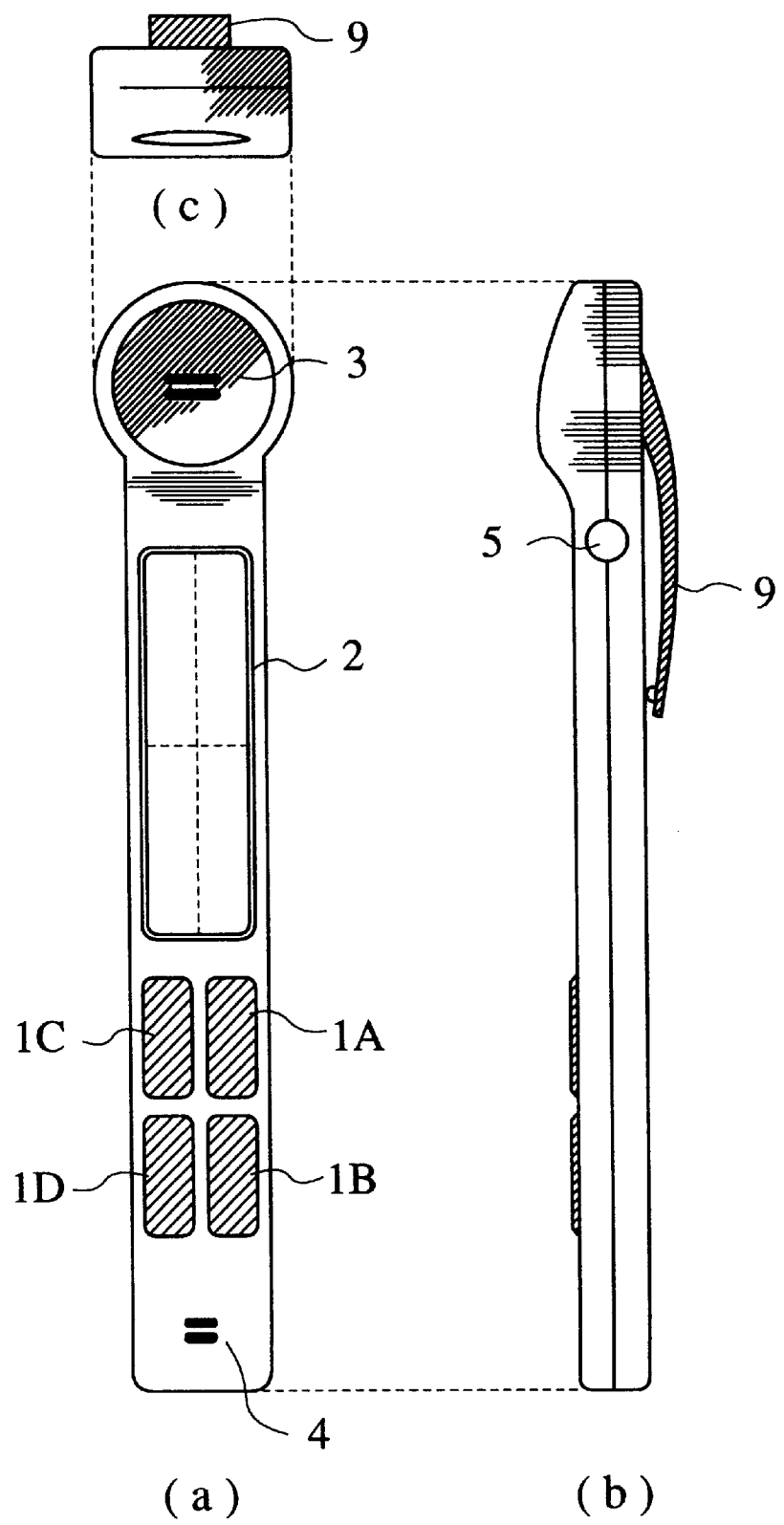
FIG. 23 is a front view, a right side view, and a top view of the thirteenth embodiment of a portable communication device according to the present invention.

Referring now to FIG. 23, the thirteenth embodiment of the portable communication device according to the present invention will be described in detail.

FIG. 23 shows a configuration of the portable communication device in the thirteenth embodiment, where a part (a) shows a front view, a part (b) shows a right side view, and a part (c) shows a top view. This configuration of FIG. 23 comprises: four input keys 1A to 1D constituting an input unit, provided on a lower middle section of a device body; a display unit 2 provided at an upper middle section of a device body above the input unit, including four display regions for displaying functions of the input keys that are provided at spatially corresponding positions, according to an operation state of the portable communication device; a speech output unit 3 provided near an upper end of a device body; a speech input unit 4 provided near a lower end of a device body; a power switch unit 5 provided on a side of a device body; and a clip unit 9 provided on a back side of a device body.

This thirteenth embodiment differs from the second embodiment described above in that the speech output section 3 has a substantially circular shape with a diameter larger than the transverse length (width) of the device body.

With this configuration of FIG. 23, it becomes possible for a user to hold the speech output unit 3 securely on his ear during the communication using the portable communication device, so that it becomes possible for the portable communication device to provide the speech output surely and clearly to a user even under a noisy environment.

Referring now to FIG. 24 to FIG. 28, one embodiment of a radio communication system according to the present invention, which incorporates the portable communication device of the present invention as described above in combination with radio base stations, will be described in detail.

Figure 24:
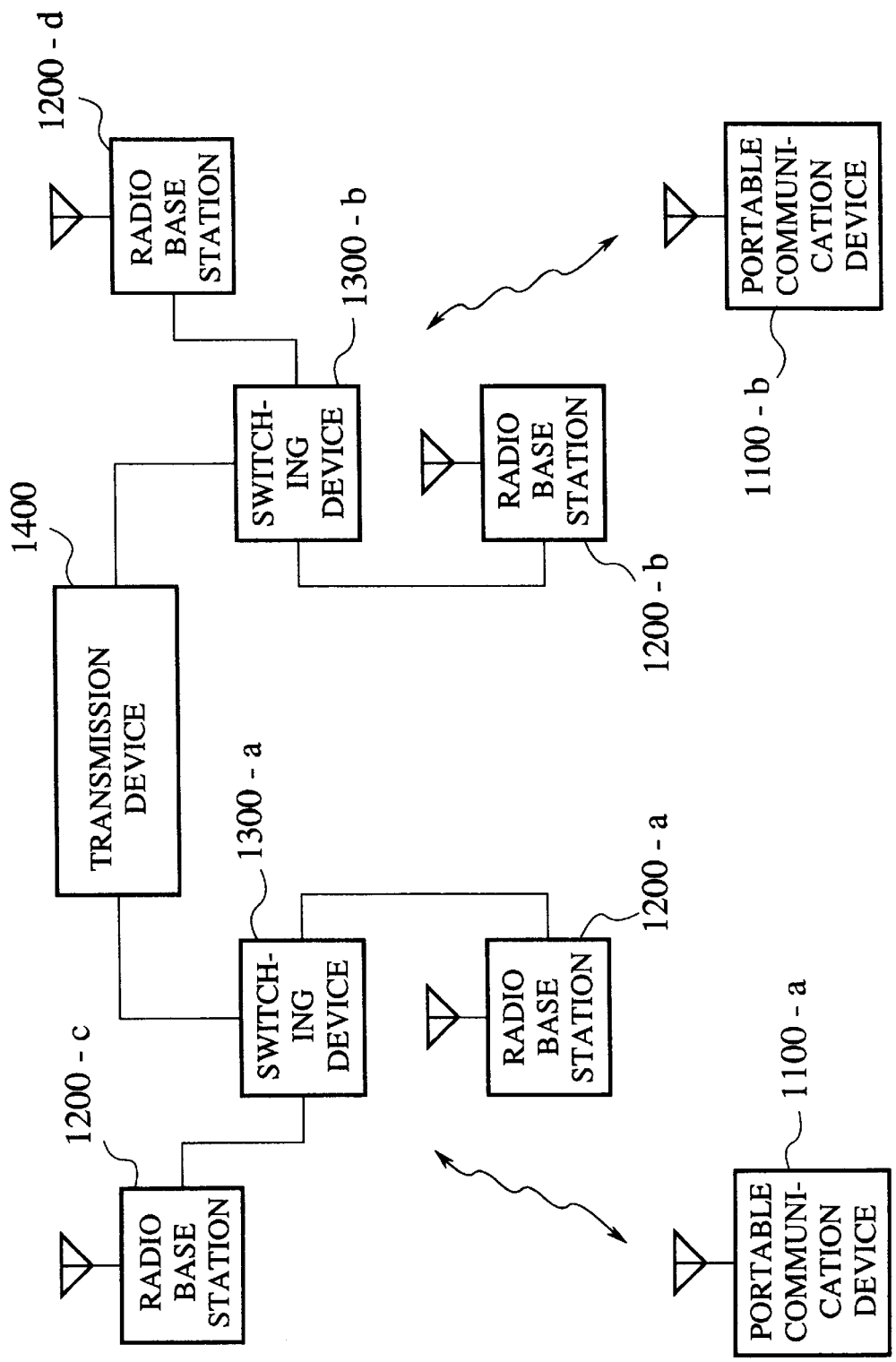
FIG. 24 is a block diagram of one embodiment of a radio communication system according to the present invention.

The radio communication system of this embodiment has an overall configuration as shown in FIG. 24, which comprises: portable communication devices 1100-a and 1100-b, each having a configuration of any of the embodiments described above; radio base stations 1200-a, 1200-b, 1200-c and 1200-d for relaying the communication among the portable communication devices; switching devices 1300-a and 1300-b for switching connections among the radio base stations; and a transmission device 1400 for connecting between the switching devices 1300-a and 1300-b. In this configuration of FIG. 24, in a case of making a communication between the portable communication devices 1100-a and 1100-b, the information such as speech, image and/or data is transmitted via the radio base station 1200-a, the switching device 1300-a, the transmission device 1400, the switching device 1300-b, and the radio base station 1200-b. In FIG. 24, only four radio base stations and two switching devices are depicted for the sake of simplicity, but a number of radio base stations connected to each switching device and a number of switching devices connected to each transmission device are not necessarily limited to these cases, and can be any desired numbers.

Figure 25:
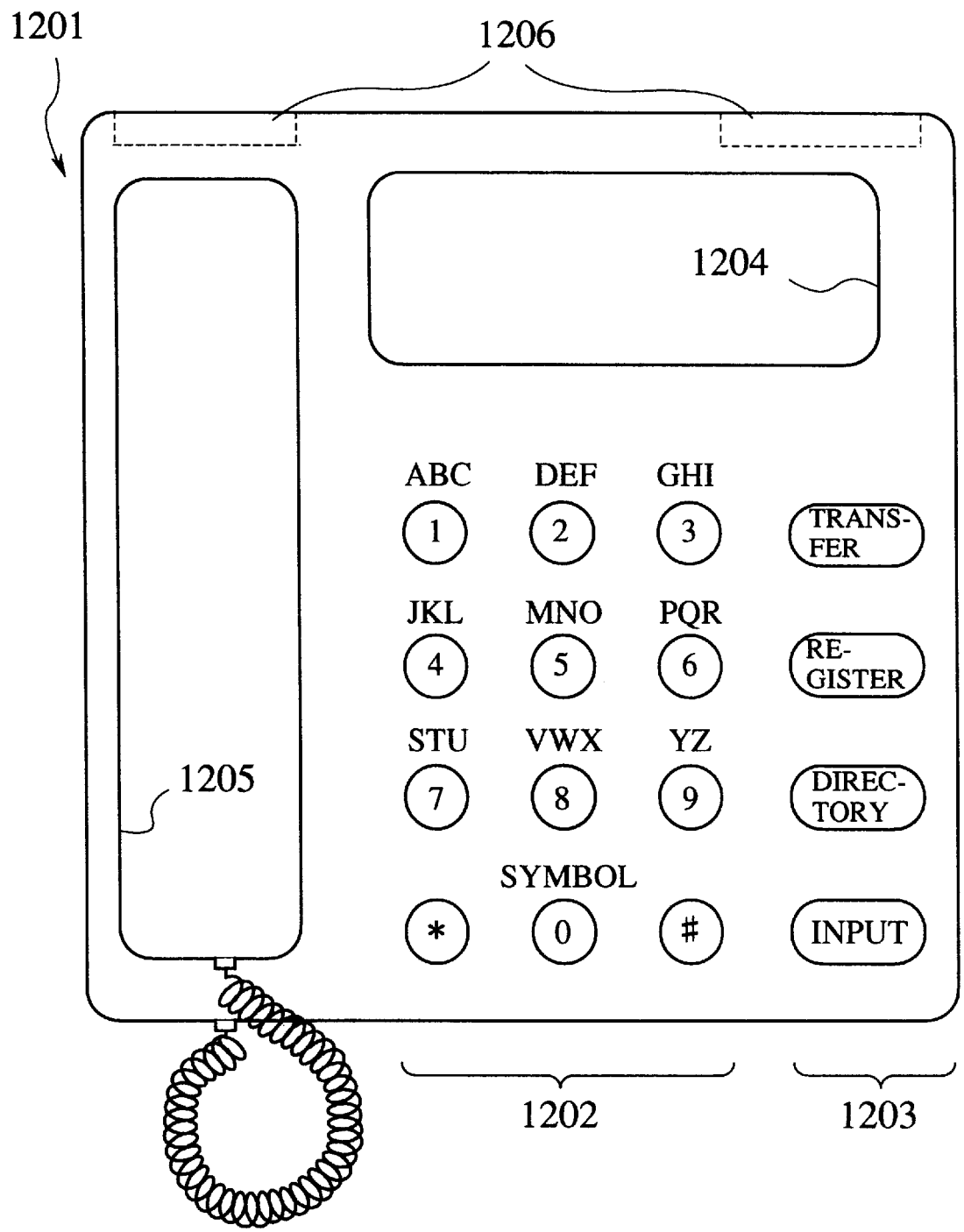
FIG. 25 is a front view of a radio base station in the radio communication system of FIG. 24.

In this radio communication system of FIG. 24, each radio base station has an external appearance as shown in FIG. 25, which comprises: a radio base station body 1201; input keys 1202 for entering numbers, alphabets, symbols, etc.; operation keys 1203 to be operated in a memory setup operation to register a telephone number to the portable communication device, etc., a display device 1204 for displaying characters, etc., entered through the input keys 1202; a handset 1205; and antenna devices 1206 for transmitting signals to the portable communication device and receiving signals from the portable communication device.

Figure 26:
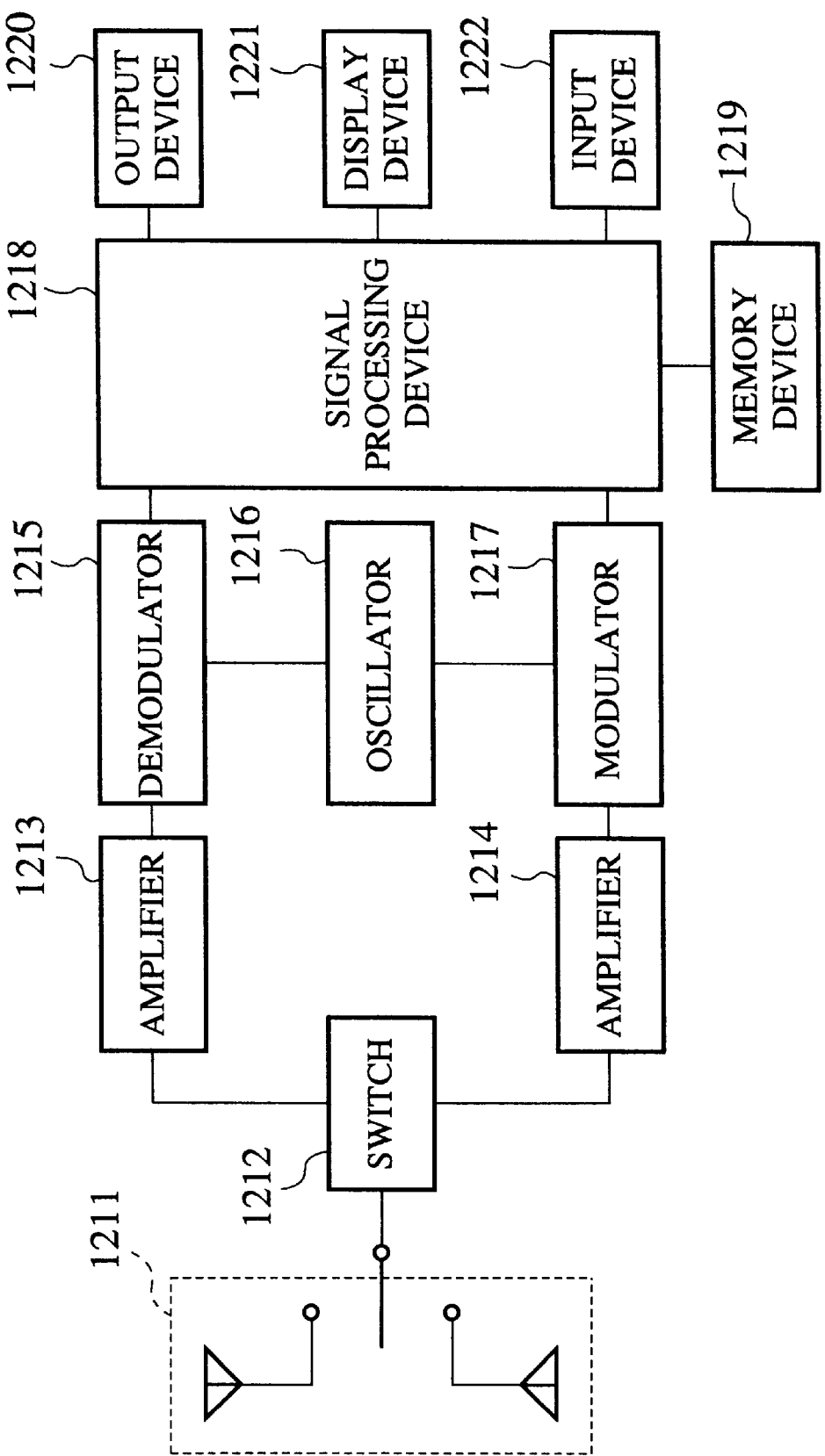
FIG. 26 is a block diagram of an internal configuration of the radio base station of FIG. 25.

This radio base station of FIG. 25 has an internal system configuration as shown in FIG. 26, which comprises: an antenna unit 1211 having a plurality of antennas; a switch 1212 connected with the antenna unit 1211, for switching the antennas; an amplifier 1213 connected with the switch 1212, for amplifying reception signals; an amplifier 1214 connected with the switch 1212, for amplifying transmission signals; a demodulator 1215 connected with the amplifier 1213, for demodulating reception signals; a modulator 1217 connected with the amplifier 1214, for modulating transmission signals; an oscillator 1216 connected with the demodulator 1215 and the modulator 1217, for generating a reference signal; a signal processing device 1218 connected with the demodulator 1215 and the modulator 1217, for processing reception signals and transmission signals; a memory device 1219 connected with the signal processing device 1218; an output device 1220 connected with the signal processing device 1218, for outputting speech signals, etc.; a display device 1221 connected with the signal processing device 1218, for displaying image information, alphanumeric information, etc.; and an input device 1222 connected with the signal processing device 1218, for entering alphanumeric information, speech and image information, etc.

In this configuration of FIG. 26, the radio base station adopts the diversity scheme in which the reception states at a plurality of antennas are compared, and transmission and reception are carried out by selectively switching to the antenna with the strongest reception field strength.

Figure 27:
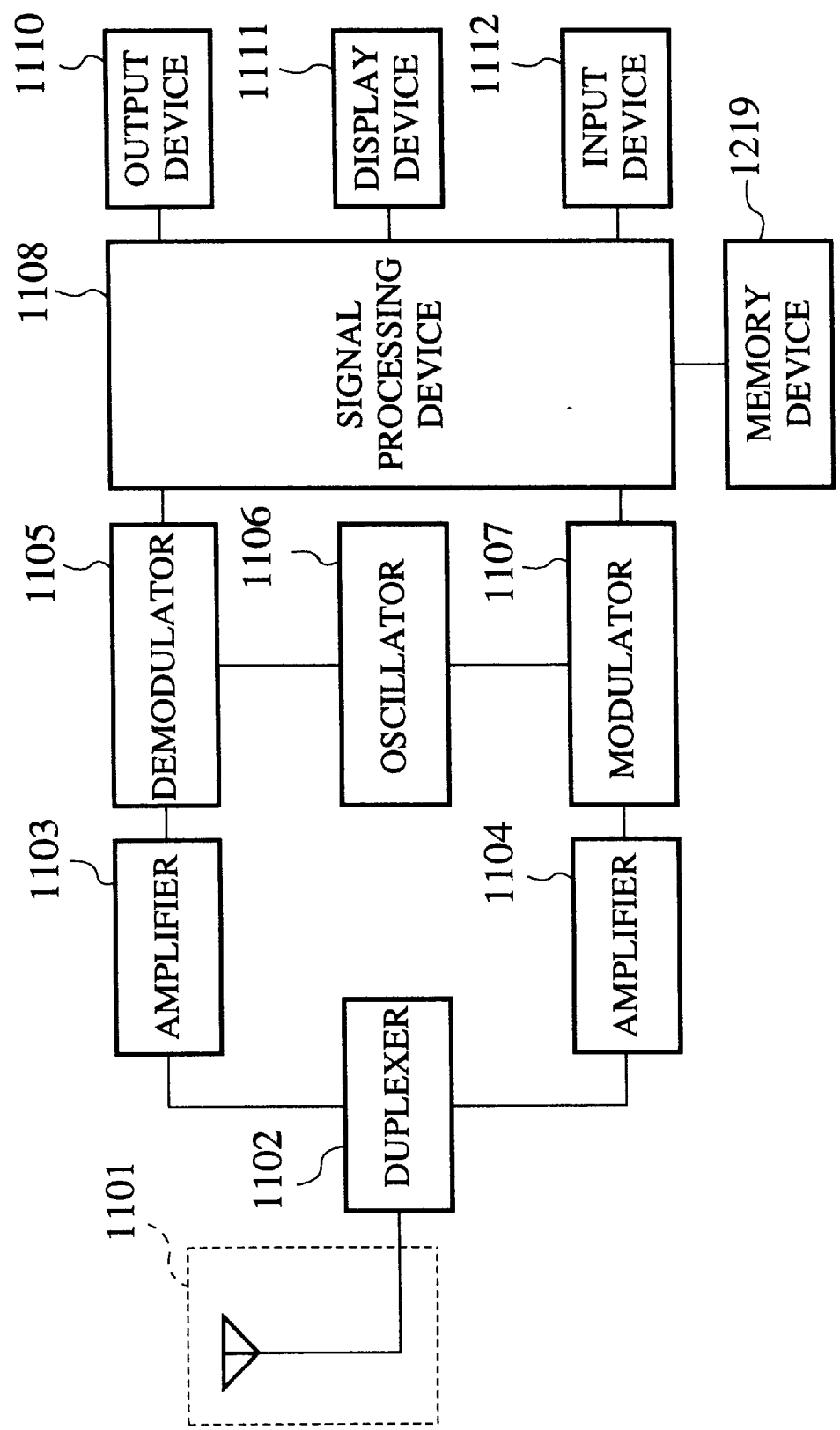
FIG. 27 is a block diagram of an internal configuration of a portable communication device in the radio communication system of FIG. 24.

Also, in this radio communication system of FIG. 24, each portable communication device has an internal system configuration as shown in FIG. 27, which comprises: an antenna unit 1101; a duplexer 1102 connected with the antenna unit 1101; an amplifier 1103 connected with the duplexer 1102, for amplifying reception signals; an amplifier 1104 connected with the duplexer 1102, for amplifying transmission signals; a demodulator 1105 connected with the amplifier 1103, for demodulating reception signals; a modulator 1107 connected with the amplifier 1104, for modulating transmission signals; an oscillator 1106 connected with the demodulator 1105 and the modulator 1107, for generating a reference signal; a signal processing device 1108 connected with the demodulator 1105 and the modulator 1107, for processing reception signals and transmission signals; a memory device 1109 connected with the signal processing device 1108; an output device 1110 connected with the signal processing device 1108, for outputting speech signals, digital data, etc.; a display device 1111 connected with the signal processing device 1108, for displaying image information, alphanumeric information, etc.; and an input device 1112 connected with the signal processing device 1108, for entering speech signals, image signals, etc.

Now, in this radio communication system, a case of registering the directory information including a name and a telephone number information of a particular receiving side into the portable communication device will be described. Note that, in the above, a method for making a memory registration of a directory information (destination information, etc.) entered at the portable communication device itself has been described, but the portable communication device only has a limited number of input keys so that it may not necessarily be very convenient to enter the alphanumeric information. Consequently, this radio communication system provides the following method for registering the directory information into the portable communication device more easily.

First, a method for making a memory registration using the radio base station and the portable communication device will be described. This is the method in which any number of information on a name, a telephone number, etc.

of a desired receiving side is entered from the input device of the radio base station and temporarily stored in the memory device of the radio base station, and then the temporarily stored information is collectively transferred to the portable communication device.

More specifically, this method can be realized by the following steps.

(1) The "register" key of the operation keys 1203 provided on the radio base station is operated to switch the operation mode of the radio base station into the directory information registration mode.

(2) The input keys 1202 provided on the radio base station are operated to enter the information on a desired receiving side. Here, the entered information is displayed on the display device 1204 provided on the radio base station, so that it is possible to enter the information while monitoring the displayed information. For example, in a case of registering a name and a telephone number of a desired receiving side as the directory information, a name information is entered through the input keys 1202, and then the "input" key of the operation keys 1203 is operated to confirm the entered name information. Then, a telephone number information is entered through the input keys 1202, and then the "input" key of the operation keys 1203 is operated to confirm the entered telephone number information. In a case of entering a plurality of information for a plurality of desired receiving sides, the above input operation for the name information and the telephone number information is to be repeated for each desired receiving side.

(3) When the input of the information on the desired receiving side is completed, the "directory" key of the operation keys 1203 is operated to finish the directory information registration mode. As a result, the entered directory information is temporarily stored in the memory device of the radio base station.

(4) In a case of transferring the temporarily stored directory information to the portable communication device, the transfer of the directory information to the portable communication device is executed by operating the "transfer" key of the operation keys 1203, and the transferred directory information is stored in a memory provided in the portable communication device. In this manner, the memory registration in the portable communication device is completed.

When the memory registration of the portable communication device is made by using the radio base station and the portable communication device in this manner, it is possible to compensate for the limited number of input keys available on the portable communication device, and the memory registration can be made easily by using the input device of the radio base station. Moreover, there is no need to consume the power of the portable communication device for the purpose of carrying out the memory registration operation on the portable communication device itself, so that it is possible to extend the durable time of the battery in the portable communication device.

Note that, in the above, a case of registering the directory information by setting a correspondence between one radio base station and one portable communication device has been described, but in a case of registering the directory information by setting a correspondence between one radio base station and a plurality of portable communication devices, it suffices to equip the radio base station with a plurality of memory devices for temporarily storing the directory information in correspondence to a plurality of portable communication devices. At a time of making a memory registration, an identifier for identifying the portable communication device is to be entered at the radio base station, and the directory information relevant for the identified portable communication device can be entered, temporarily stored, and eventually transferred by making accesses to the memory device corresponding to the identified portable communication device.

Next, a method for making a memory registration in the portable communication device using the radio communication system as a whole will be described. This is the method in which the transmission device has a registration means for registering information on subscribers of the radio communication system, and this registration means in the transmission device is accessed to obtain the directory information for a desired receiving side from the registered subscriber information. The obtained directory information is then transferred to the specified radio base station, temporarily stored in the memory device of the radio base station, and eventually transferred from the radio base station to the portable communication device.

More specifically, this method can be realized by the following steps.

(1) The "register" key of the operation keys 1203 provided on the radio base station is operated to switch the operation mode of the radio base station into the directory information registration mode. (2) The input keys 1202 provided on the radio base station are operated to enter an access information (such as an access number, for example) for an access to the registration means of the transmission device is entered. Then, the connection to the registration means is made, and an information for specifying a desired receiving side is transferred, to have the subscriber information of the specified receiving side registered in the registration means transferred back to the radio base station as the directory information.

(3) The information transferred from the registration means is appropriately displayed on the display device 1204 of the radio base station, and when the transfer of the information on the desired receiving side is completed, the "directory" key of the operation keys 1203 is operated to finish the directory information registration mode. As a result, the entered directory information is temporarily stored in the memory device of the radio base station.

(4) Afterwards, the transfer of the temporarily stored directory information to the portable communication device is executed by operating the "transfer" key of the operation keys 1203, and the transferred directory information is stored in a memory provided in the portable communication device. In this manner, the memory registration in the portable communication device is completed.

Figure 28:
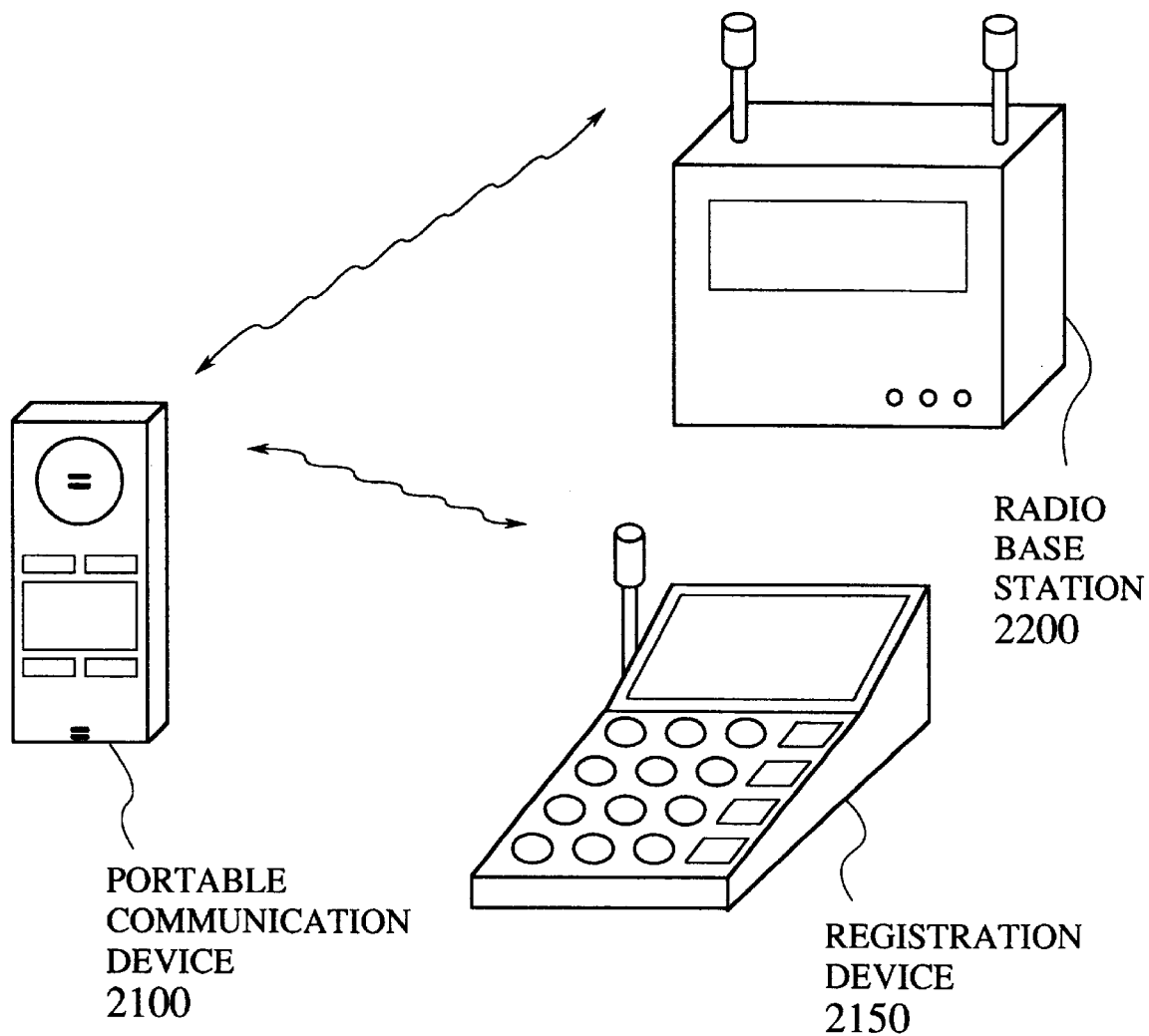
FIG. 28 is a schematic diagram of an alternative configuration of a radio communication system according to the present invention.

By providing the registration means for registering the subscriber information in advance at the transmission device of the radio communication system, and then calling up the information on a desired receiving side and transferring it to the portable communication device in this manner, there is no need for a user of the portable communication device himself to enter the directory information in order to create the directory. In addition, it is possible to obtain the directory information for the desired receiving side easily, by simply entering the information for specifying a desired receiving side via the input device of the radio base station, Next, a method for making a memory registration in the portable communication device by providing a dedicated memory registration device separately from the radio base station will be described with reference to FIG. 28. In FIG. 28, the radio communication system includes a portable communication device 2100 similar to that described above, a radio base station 2200 similar to that described above but not having a memory registration function, and a memory registration device 2150 for registering the directory information into the portable communication device 2100. This memory registration device 2150 is equipped at least with input keys for entering numerical information and a display key for monitoring an entered result. Here, the procedure for the directory information registration operation is similar to the first method described above, so that it will not be repeated here.

By providing the memory registration device separately from the radio base station in this manner, it becomes possible to carry out the memory registration operation regardless of the location of the radio base station. Moreover, the memory registration operation can be carried out at a current location of a user by means of this separate memory registration device, so that the user's convenience in handling the radio communication system can be improved.

Note that, even in this configuration having the memory registration device separately from the radio base station, it is also possible to obtain the directory information by making an access to the registration means provided in the transmission device similarly as in the second method described above, It is to be noted that the above described memory registration methods are directed to a case of transferring the directory information by radio, from a temporary memory provided in the radio base station or the memory registration device to a memory of the portable communication device, but it is also possible to adopt a method for transferring the directory information by wire, by providing connection terminals for this purpose on the portable communication device and making a wire connection with the radio base station or the memory registration device by means of these connection terminals. In particular, in a case of sharing a single radio base station by a plurality of portable communication devices, it becomes possible to transfer the directory information only to the wire connected portable communication device in this case, so that it becomes possible to carry out the information transfer surely.

As described, the portable communication device of the present invention is basically characterized by having an input unit with a plurality of input keys, and a display unit for displaying function names of the input keys in correspondence to the spatial arrangement of the input keys. In addition, it is also possible to provide the following addition functions in the above described portable communication device.

First, it is possible to provide a memory unit for storing settings of functions assigned to the input keys, and an operation mode for enabling a user to change these input key function assignment settings. In this manner, it becomes possible to provide a customized portable communication device which is convenient to use for each user. Note that this type of customization is only possible as the input keys and the function displays are separately provided according to the present invention.

Here, the input key function assignment settings can be changed as follows, for example. Namely, it is possible to provide an operation mode to change the input key function assignment setting cyclically, so that the four functions assigned to the input keys 1A, 1B, 1C and 1D in this order can be cyclically rotated clockwise to realize the setting in which these four functions are assigned to the input keys 1B, 1C, 1D and 1A in this order, for instance.

Also, in a case of a configuration having an up-down or left-right symmetrical arrangement for the input unit and the display unit (such as configurations of FIG. 2, FIG. 10, etc.), it is possible to provide a memory unit for storing each input key function assignment setting to be reversible with respect to a symmetrical axis so that the functions assigned to the input keys in symmetrical relationship with each other can be interchanged. In this manner, it becomes possible for a manufacturer of the portable communication device to manufacture the portable communication device without distinguishing the device for left handed user and the device for right handed user, and it also becomes possible for a user to reverse the input key function assignment setting according to his convenience.

It is also possible to provide a memory unit for storing a plurality of different types of display formats or display contents for the display of the function names assigned to the input keys. For example, in a case of Japanese, a display in kanji-kana mixed expression, a display in hiragana-only expression, a display in katakana-only expression, a display in romaji expression, etc., can be provided for the same display content in advance, such that a user can select a desired display format by means of a display format setting mode. In this manner, it is possible to provide the portable communication device which is easy to use even for a user who is not proficient in reading kanji.

Similarly, it is also possible to provide a plurality of displays using different font settings for the same display content in advance, such that a user can select a display in a desired font setting by means of a display format setting mode according to his preference.

In addition, it is also possible to provide a plurality of displays in different languages for the same display content, such that a user can select a display in a desired language by means of a display format setting mode according to his need. In this manner, it becomes possible to provide the portable communication device which can be used by many people with different mother tongues.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A portable communication device, comprising:
    a power switch for turning a power of the portable communication device on/off;
    an input unit having N input keys, where N is an integer greater than one, said N input keys being only keys other than the power switch that are available on the portable communication device for entering a user's input into the portable communication device;
    a display unit having N display regions in one-to-one correspondence to all the input keys that constitute the input unit, for displaying names of functions assigned to the input keys in an arrangement corresponding to a spatial arrangement of the input keys; and
    a communication unit for making a communication by transmitting and receiving communication data according to the user's input entered by operating the input keys.
2. The portable communication device of claim 1, wherein the communication unit operates in a number of operation states in making the communication, and for each input key, the display unit selectively displays a name of one function from a number of different functions assigned to each input key in correspondence to said number of operation states, according to an operation state of the communication unit.

3. The portable communication device of claim 2, wherein the operation states of the communication unit includes a communication waiting state before the communication is made, and a communicating state during the communication.

4. The portable communication device of claim 1, further comprising a memory unit for storing information on communication receiving sides, wherein the display unit also displays the information on communication receiving sides stored in the memory unit.

5. The portable communication device of claim 4, wherein the input unit selectively specify an information on a desired communication receiving side among the information on communication receiving sides displayed on the display unit, in response to a user's input entered by operating the input keys, to start a communication line connection procedure with respect to the desired communication receiving side.

6. The portable communication device of claim 1, further comprising a speech input unit for converting speech signals entered by a user into the communication data to be transmitted by the communication unit, and a speech output unit for converting the communication data received by the communication unit into speech signals to be given to a user.

7. The portable communication device of claim 1, wherein the input keys of the input unit are arranged at more than one of spatially separated areas on the portable communication device which are distributed around the display regions of the display unit.

8. The portable communication device of claim 1, wherein the input keys of the input unit are collectively arranged at an area on the portable communication device which is spatially separated from an area occupied by the display unit.

9. The portable communication device of claim 1, further comprising a memory unit for storing a setting of functions assigned to the input units, and a set up unit for changing the setting stored in the memory unit.

10. The portable communication device of claim 9, wherein the set up unit changes the setting to interchange the functions assigned to symmetrically arranged ones of the input units.

11. The portable communication device of claim 1, further comprising a memory unit for storing displays in a plurality of different display forms for each display content to be displayed by the display unit, and a set up unit for selecting one of said plurality of different display forms, such that the display unit selectively displays one display in selected one of said plurality of different display forms for each display content.

12. The portable communication device of claim 1, wherein each of the N input keys is arranged around the display unit within a predetermined distance with respect to the corresponding display region.

13. The portable communication device of claim 1, further comprising:
a speech output unit provided on one side of the portable communication device; and
a speech input unit provided on the one side of the portable communication device;
wherein the display unit is disposed on the one side of the portable communication device, and
wherein the input keys are disposed on another side of the portable communication device.

14. The portable communication device of claim 13, wherein the another side of the portable communication device is adjacent to the one side of the portable communication device, and corresponds to a side surface of the portable communication device.

15. The portable communication device of claim 1, wherein the N input keys include a first subset of numeric keys and a second subset of non-numeric keys.

16. A radio communication system, comprising:
a portable communication device including:
a power switch for turning a power of the portable communication device on/off;
an input unit having N input keys, where N is an integer greater than one, said N input keys being only keys other than the power switch that are available on the portable communication device for entering a user's input into the portable communication device;
a display unit having N display regions in one-to-one correspondence to all the input keys that constitute the input unit, for displaying names of functions assigned to the input keys in an arrangement corresponding to a spatial arrangement of the input keys;
a memory unit for storing information on communication receiving sides to be communicated with; and
a communication unit for making a communication by transmitting and receiving communication data according to the user's input entered by operating the input keys; and
an information transfer device including:
a storage unit for temporarily storing externally entered information on communication receiving sides; and
a transfer unit for transferring the information on communication receiving sides from the storage unit to the memory unit of the portable communication device.

17. The radio communication system of claim 16, wherein the information transfer device is a radio base station capable of connecting a communication line connected to a desired communication receiving side, and the portable communication device makes the communication with the desired communication receiving side via the radio base station.

18. The radio communication system of claim 16, further comprising a radio base station capable of connecting a communication line connected to a desired communication receiving side, which is provided separately from the information transfer device, wherein the portable communication device makes the communication with the desired communication receiving side via the radio base station.

19. The radio communication system of claim 16, further comprising a transmission device for transmitting the communication data from the portable communication device via a radio base station to a desired communication receiving side.

20. The radio communication system of claim 19, wherein the transmission device has a memory for storing information on subscribers of the radio communication system, from which the information on communication receiving sides are entered into the storage unit of the information transfer device.

21. The radio communication system of claim 16, wherein each of the N input keys is arranged around the display unit within a predetermined distance with respect to the corresponding display region.

22. The radio communication system of claim 16, wherein the N input keys include a first subset of numeric keys and a second subset of non-numeric keys.

* * * * *